United States Patent
Xu et al.

(10) Patent No.: US 10,834,653 B2
(45) Date of Patent: *Nov. 10, 2020

(54) ELECTRONIC DEVICE AND WIRELESS COMMUNICATION METHOD IN WIRELESS COMMUNICATION SYSTEM

(71) Applicant: Sony Corporation, Tokyo (JP)

(72) Inventors: Xiaodong Xu, Beijing (CN); Yi Zhang, Beijing (CN); Yunqiu Xiao, Beijing (CN); Ce Wang, Beijing (CN); Xi Ke, Beijing (CN); Bingshan Hu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/374,764

(22) Filed: Apr. 4, 2019

(65) Prior Publication Data

US 2019/0289520 A1    Sep. 19, 2019

Related U.S. Application Data

(63) Continuation of application No. 15/771,724, filed as application No. PCT/CN2016/103020 on Oct. 24, 2016, now Pat. No. 10,306,531.

(30) Foreign Application Priority Data

Nov. 5, 2015 (CN) .......................... 2015 1 0751026

(51) Int. Cl.
*H04W 36/00* (2009.01)
*H04W 36/30* (2009.01)
(Continued)

(52) U.S. Cl.
CPC ....... *H04W 36/30* (2013.01); *H04W 36/0055* (2013.01); *H04W 36/08* (2013.01);
(Continued)

(58) Field of Classification Search
CPC . H04W 36/30; H04W 36/36; H04W 1/72522; H04W 88/02; H04W 36/32; H04W 36/305; H04M 1/72519
(Continued)

(56) References Cited

U.S. PATENT DOCUMENTS 7,853,202 B1   12/2010  Visotsky et al.
7,873,338 B2   1/2011   Visotsky et al.
(Continued)

FOREIGN PATENT DOCUMENTS

CN    102547881 A    7/2012
CN    102769938 A    11/2012
(Continued)

OTHER PUBLICATIONS

Extended Search Report issued in European Application 16861445.1-1214 dated Sep. 26, 2018.
(Continued)

*Primary Examiner* — Danh C Le
(74) *Attorney, Agent, or Firm* — Xsensus LLP

(57) ABSTRACT

The present disclosure relates to an electronic device and a wireless communication method in a wireless communication system. The electronic device of the present disclosure comprises one or more processing circuits, configured to: acquire scenario identification information, comprising first link information that indicates the quality of a link between the electronic device and a user equipment, second link information that indicates the quality of a link between the electronic device and a base station, serving cell received power change rate information, and neighboring cell received power change rate information; and determine scenario information based on the scenario identification information, to inform the user equipment, so as to assist the user equipment to execute a relay reselection process, or to
(Continued)

assist the electronic device to execute a relay selection process. By using the electronic device and the wireless communication method of the present disclosure, a remote user equipment is enabled to acquire a scenario in which the electronic device is located, so that the remote user equipment can better perform relay reselection or that the electronic device can better execute relay selection, thereby increasing the system performance and reducing overheads of an X2 interface.

11 Claims, 11 Drawing Sheets

(51) Int. Cl.
    *H04W 36/08*     (2009.01)
    *H04W 88/02*     (2009.01)
    *H04M 1/725*     (2006.01)
    *H04W 84/04*     (2009.01)
    *H04W 36/36*     (2009.01)

(52) U.S. Cl.
    CPC .... *H04M 1/72519* (2013.01); *H04M 1/72522* (2013.01); *H04W 36/36* (2013.01); *H04W 84/047* (2013.01); *H04W 88/02* (2013.01)

(58) Field of Classification Search
    USPC ................ 455/437, 550.1, 439; 370/331
    See application file for complete search history.

(56) References Cited

U.S. PATENT DOCUMENTS

| | | | |
|---|---|---|---|
| 8,879,980 B2 | 11/2014 | Bienas et al. | |
| 2008/0107073 A1 | 5/2008 | Hart et al. | |
| 2009/0303895 A1 | 12/2009 | Zhang et al. | |
| 2010/0056157 A1* | 3/2010 | Verona | H04W 36/30 455/438 |
| 2010/0296475 A1 | 11/2010 | Visotsky et al. | |
| 2012/0076027 A1 | 3/2012 | Akyildiz et al. | |
| 2012/0315916 A1 | 12/2012 | Van Phan et al. | |
| 2013/0040558 A1 | 2/2013 | Kazmi | |
| 2014/0016537 A1 | 1/2014 | Khobare et al. | |
| 2014/0092736 A1 | 4/2014 | Baillargeon | |
| 2014/0187255 A1* | 7/2014 | Dimou | H04B 1/38 455/452.2 |
| 2014/0213256 A1* | 7/2014 | Meylan | H04W 48/18 455/436 |
| 2015/0011232 A1* | 1/2015 | Zhang | H04W 28/085 455/453 |
| 2015/0140926 A1* | 5/2015 | Fujio | H04B 7/15528 455/7 |
| 2015/0189021 A1* | 7/2015 | Yang | H04L 67/141 348/14.07 |
| 2015/0296526 A1 | 10/2015 | Behravan et al. | |
| 2015/0373620 A1* | 12/2015 | Wong | H04W 40/04 370/338 |
| 2016/0183271 A1* | 6/2016 | Zhou | H04B 17/309 370/315 |
| 2017/0230880 A1* | 8/2017 | Oroskar | H04W 36/22 |
| 2017/0251507 A1* | 8/2017 | Fodor | H04W 76/14 |
| 2017/0347338 A1 | 11/2017 | Chen et al. | |
| 2018/0054756 A1* | 2/2018 | Kahtava | H04W 28/0284 |
| 2018/0063761 A1* | 3/2018 | Senoo | H04W 36/06 |
| 2018/0092017 A1* | 3/2018 | Freda | H04W 76/14 |
| 2018/0138640 A1* | 5/2018 | Maesoba | H01R 24/60 |
| 2018/0139682 A1* | 5/2018 | Xu | H04W 88/04 |
| 2018/0139794 A1* | 5/2018 | Chae | H04W 40/12 |
| 2018/0176805 A1* | 6/2018 | Lee | H04W 24/08 |
| 2018/0184436 A1* | 6/2018 | Ohtsuji | H04B 7/15507 |
| 2018/0234919 A1 | 8/2018 | Tsuda et al. | |
| 2018/0242381 A1* | 8/2018 | Wei | H04W 76/14 |
| 2018/0255505 A1* | 9/2018 | Thyagarajan | H04J 11/0069 |
| 2018/0317268 A1* | 11/2018 | Kim | H04W 76/14 |
| 2018/0352411 A1* | 12/2018 | Ryu | H04W 40/24 |
| 2019/0274053 A1* | 9/2019 | Wang | H04W 72/0446 |

FOREIGN PATENT DOCUMENTS

| | | |
|---|---|---|
| CN | 102843716 A | 12/2012 |
| WO | 2014/109142 A1 | 7/2014 |

OTHER PUBLICATIONS

ETRI, "Procedure for UE-to-Network Relay Selection/Reselection", 3GPP Draft; R2-152419 UE-to-Network Relay, 3rd Generation Partnership Project (3GPP), 3GPP TSG RAN WG2 #90, 4 Pages total, (May 25-29, 2015).

Qualcomm (Rapporteur), "Report of Email Discussion [91#31] [LTE/D2D] Relay Selection and Reselection", 3GPP Draft; R2-154918 Report of RAN22 91 Relay Selection Reselection, 3rd Generation Partnership Project (3GPP), 3GPP TSG-RAN WG2 Meeting #91 Bis. 18 Pages total. (Oct. 5-9, 2015).

Ericsson, "Relay Selection Criteria for Public Safety Discovery", 3GPP Draft; R2-153597—Relay Selection Criteria for Public Safety Discovery, 3rd Generation Partnership Project (3GPP), 3GPP TSG RAN WG2 #91, 4 Pages total, (Aug. 24-28, 2015).

Zte et al., "Discussion on Remote UE's Relay Discovery, Selection and Reselection", 3GPP Draft; R2-153766 Discussion on Relay Selection and Reselection, 3rd Generation Partnership Project (3GPP), 3GPP TSG RAN WG2 # 91, 6 pages total (Aug. 24-28, 2015).

Intel Corporation, "Considerations for UE-to-Network Relay Selection and Reselection" 3GPP Draft; R2-152224, 3rd Generation Partnership Project (3GPP), 3GPP TSG RAN WG2 Meeting # 90, 5 pages total (May 25-29, 2015).

International Search Report dated Jan. 25, 2017 in PCT/CN2016/103020 therein 3 pages.

"Support of Uu link quality in relay selection", Qualcomm Incorporated, 3GPP TSG-RAN WG1 #82, R1-154721, Aug. 2015, pp. 1-8.

"Enhanced LTE Device to Device Proximity Services", Qualcomm Incorporated, 3GPP TSG RAN Meeting #69, RP-151337, Sep. 2015, pp. 1-14.

Chinese Office Action dated Jul. 3, 2019, issued in Chinese Application No. 201510751026.4, 6 pages.

3GPP TSG-RAN WG2 #90, Procedure for UE-to-Network Relay selection/reselection, ETRI, R2-152419, Fukuoka, Japan, May 25-29, 2015, 4 pages.

3GPP TSG-RAN WG2 #91, Relay selection criteria for public safety discovery, Ericsson, Tdoc R2-153597, Beijing, P.R. China, Aug. 24-28, 2015, 4 pages.

3GPP TSG-RAN WG2 Meeting #91 Bis, Report of email discussion [91#31][LTE/D2D] Relay selection and reselection, Qualcomm, R2-154918, Malmo, Sweden, Oct. 5-9, 2015, 18 pages.

* cited by examiner

ELECTRONIC DEVICE AND WIRELESS COMMUNICATION METHOD IN WIRELESS COMMUNICATION SYSTEM

CROSS-REFERENCE TO RELATED APPLICATIONS

The present application is a continuation of U.S. application Ser. No. 15/771,724, filed on Apr. 27, 2018, which is based on PCT Application No. PCT/CN2016/103020, filed on Oct. 24, 2016, and claims the priority to Chinese Patent Application No. 201510751026.4, titled "ELECTRONIC DEVICE AND WIRELESS COMMUNICATION METHOD IN WIRELESS COMMUNICATION SYSTEM", filed on Nov. 5, 2015 with the State Intellectual Property Office of the PRC, the entire contents of each are incorporated herein by reference.

FIELD

The present disclosure relates to the technical field of wireless communication, and in particular to an electronic device in a wireless communication system and a method for performing wireless communication in a wireless communication system.

BACKGROUND

This section provides background information relating to the present disclosure, which is not necessarily prior art.

A relay user equipment (UE) is introduced in Release 13 (R13) of a Long Term Evolution-Advanced (LTE-A) system. A remote UE far away from a base station may communicate with the base station via the relay UE, and thus a network coverage can be expanded and a cell edge user speed and a frequency spectrum reuse rate can be improved. The relay UE is a foreground technology of the LTE-A system. Practically, in an actual scenario, the relay UE and the remote UE may move continuously, and in this case, the remote UE needs to perform relay reselection continuously to ensure continuity of a service. The relay reselection may be triggered in the following two cases. In a first case, a quality of a PC5 link between the remote UE and the relay UE becomes poor. In a second case, a quality of a Uu link between the relay UE and the base station becomes poor. In the first case, the quality of the Uu link is good and the quality of the PC5 link becomes poor, and the remote UE triggers the relay reselection process based on the signal quality of the PC5. In this case, service interruption only occurs at the remote UE side, and the relay UE is hardly influenced. In the second case, the quality of the PC5 link is good and the quality of the Uu link becomes poor, and whether to perform relay reselection by the remote UE is under a standardized discussion.

In order to ensure the continuity of the service, it is considered that the remote UE needs to perform the relay reselection process when the quality of the Uu link becomes poor in the present disclosure. Practically, in an actual scenario, the quality of the Uu link becomes poor due to multiple reasons, for example, the relay UE is to perform a handover process or the relay UE is to move out of a coverage of a serving cell. For different reasons resulting in that the quality of the Uu link becomes poor, the remote UE and the relay UE may perform different operations. In the conventional technology, the reasons resulting in that the quality of the Uu link becomes poor are not distinguished, that is, the remote UE cannot know a scenario where the relay UE is located and an operation which the relay UE is to perform. Therefore, it is necessary to put forward a new wireless communication technical solution, such that the remote UE can know the scenario where the relay UE is located, so as to assist the remote UE to perform relay reselection or assist the relay UE to perform relay selection.

SUMMARY

This section provides a general summary of the present disclosure, and is not a comprehensive disclosure of its full scope or all of its features.

An object of the present disclosure is to provide an electronic device in a wireless communication system and a method for performing wireless communication in a wireless communication system, such that the remote UE can know a scenario where a relay UE is located, the relay UE can assist the remote UE to perform relay reselection or the remote UE can assist the relay UE to perform relay selection, thereby improving a system performance and reducing an overhead of an X2 interface.

According to an aspect of the present disclosure, an electronic device in a wireless communication system is provided, which includes one or more processing circuits configured to perform operations of: acquiring scenario identification information, the scenario identification information including first link information indicating a quality of a link between the electronic device and a user equipment in the wireless communication system, second link information indicating a quality of a link between the electronic device and a base station in a serving cell for providing a service for the electronic device in the wireless communication system, received serving cell power change rate information and received neighbor cell power change rate information; and determining, based on the scenario identification information, scenario information on a scenario where the electronic device is located to inform the user equipment, so as to assist the user equipment to perform a relay reselection process or assist the electronic device to perform a relay selection process.

According to another aspect of the present disclosure, an electronic device in a wireless communication system is provided, which includes: a transceiver configured to send first link information indicating a quality of a link between the electronic device and a relay user equipment providing a relay service for the electronic device in the wireless communication system, to the relay user equipment; and one or more processing circuits configured to perform operations of: acquiring scenario information on a scenario where the relay user equipment is located; and performing a relay reselection process based on the scenario information.

According to another aspect of the present disclosure, a method for performing wireless communication in a wireless communication system is provided, which includes: acquiring scenario identification information, the scenario identification information including first link information indicating a quality of a link between a relay user equipment in the wireless communication system and a remote user equipment in the wireless communication system, second link information indicating a quality of a link between the relay user equipment and a base station in a serving cell for providing a service for the relay user equipment in the wireless communication system, received servicing cell power change rate information and received neighbor cell power change rate information; and determining, based on the scenario identification information, scenario information on a scenario where the relay user equipment is located to inform the remote user equipment, so as to assist the remote user equipment to perform a relay reselection process or assist the relay user equipment to perform a relay selection process.

According to another aspect of the present disclosure, a method for performing wireless communication in a wireless communication system is provided, which includes: sending first link information indicating a quality of a link between a remote user equipment and a relay user equipment providing a relay service for the remote user equipment in the wireless communication system, to the relay user equipment; acquiring scenario information on a scenario where the relay user equipment is located; and performing a relay reselection process based on the scenario information.

According to another aspect of the present disclosure, a method for performing wireless communication in a wireless communication system is provided, which includes: monitoring a quality of a link between a remote user equipment and a relay user equipment for providing a relay service for the remote user equipment in the wireless communication system; monitoring a quality of a link between the relay user equipment and a base station in a serving cell for providing a service for the relay user equipment and the remote user equipment in the wireless communication system; monitoring a change rate of received power of a neighbor cell and a change rate of received power of the serving cell; when the quality of the link between the remote user equipment and the relay user equipment is greater than a first threshold, the quality of the link between the relay user equipment and the base station is less than a second threshold, and a difference between the change rate of received power of the neighbor cell and the change rate of received power of the serving cell is greater than a third threshold, acquiring information indicating a quality of received signals of a neighbor cell; determining candidate target cells for performing relay reselection for the remote user equipment, based on the information indicating the quality of received signals of the neighbor cell; setting a bias value for each of the candidate cells; and performing a relay reselection process of the remote user equipment based on the bias value.

With the electronic device in the wireless communication system according to the present disclosure and the method for performing wireless communication in the wireless communication system, the relay UE can determine the scenario where the relay UE is located and notifies the remote UE of the scenario information, such that the relay UE can assist the remote UE to perform relay reselection or the remote UE can assist the relay UE to perform relay selection, thereby improving the system performance and reducing the overhead of the X2 interface.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. In the drawings.

Figure 1A:
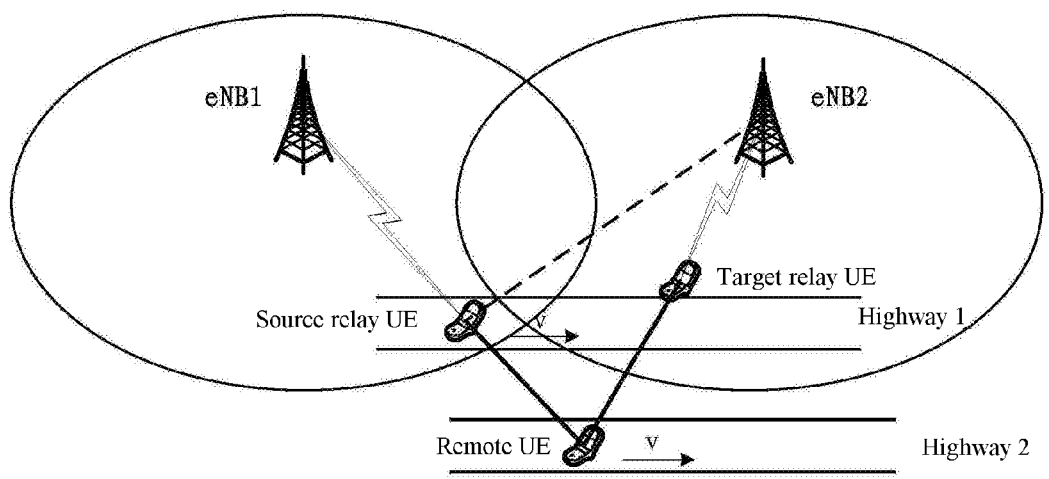
FIG. 1(a) is a schematic diagram showing a scenario in which a quality of a Uu link becomes poor.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION OF EMBODIMENTS

Examples of the present disclosure will now be described more fully with reference to the accompanying drawings.

The following description is merely exemplary in nature and is not intended to limit the present disclosure, application, or uses.

Example embodiments are provided such that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

A user equipment (UE) involved in the present disclosure includes but not limited to terminals with a wireless communication function such as a mobile terminal, a computer, and an on-board device. Further, depending on the described functions, the UE involved in the present disclosure may be the UE itself or a component of the UE such as a chip. In addition, similarly, a base station involved in the present disclosure may be an eNB or a component of the eNB such as a chip. Further, technical solutions according to the present disclosure may be applied to a frequency division duplexing (FDD) system.

The following scenario is considered firstly in the present disclosure. A source relay UE is in a coverage of an eNB1, a remote UE is beyond the coverage of the eNB1, and the remote UE communicates with the eNB1 via the source relay UE. Then, the source relay UE and the remote UE start to move, and the source relay UE is always close to the remote UE, that is, a quality of a PC5 link is always good. The source relay UE is increasingly far away from the eNB1 and increasingly close to the eNB2, that is, a quality of the Uu link becomes poor. FIG. 1(a) shows a specific example of the above scenario. As shown in FIG. 1(a), the source relay UE and the remote UE move in two parallel highways. Here, a highway 1 indicates a high-speed rail and is in a coverage of the eNB2. A highway 2 is a road around the high-speed rail and is surrounded by mountains and trees and is beyond a coverage of any eNB. It is assumed that the source relay UE and the remote UE move almost with a same speed in a same direction, and a relative speed between them is small. It may be seen from FIG. 1(a) that, the source relay UE is always close to the remote UE, it is indicated that the quality of the PC5 link is always good. The source relay UE is increasingly far away from the eNB1 and increasingly close to the eNB2, it is indicated that the quality of the Uu link becomes poor and a signal quality of a neighbor cell is increased significantly. During the process, in order to ensure continuity of respective services, the source relay UE is to perform a handover process, that is, switching to a cell covered by the eNB2, and the remote UE is to perform a relay reselection process, that is, reselecting a target relay UE in a coverage of other eNB.

Figure 1B:
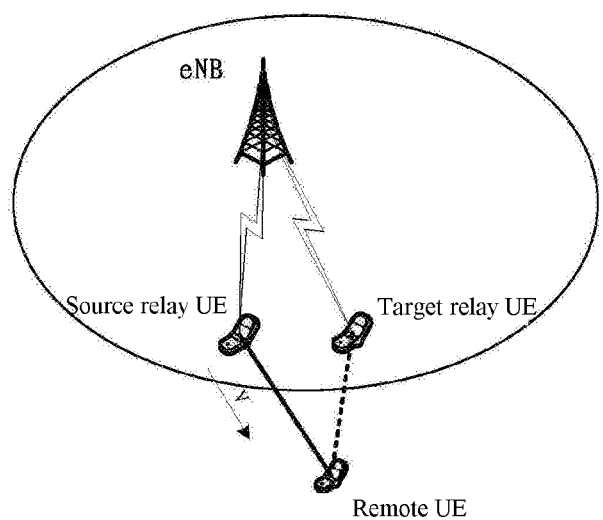
FIG. 1(b) is a schematic diagram showing another scenario in which a quality of a Uu link becomes poor.

FIG. 1(b) is a schematic diagram showing another scenario in which a quality of the Uu link becomes poor. As shown in FIG. 1(b), initially, a source relay UE is in a coverage of an eNB, a remote UE is beyond a coverage of the eNB, and the remote UE communicates with the eNB via the source relay UE. Then, the source relay UE starts to move from inside of the coverage of the eNB to outside of the coverage of the eNB, and there is no other eNB around. It may be seen from FIG. 1(b) that, the source relay UE is always close to the remote UE, it is indicated that the quality of the PC5 link is always good. The source relay UE is increasingly far away from the eNB, it is indicated that the quality of the Uu link becomes poor. In addition, a downlink quality of a neighbor cell reduces or hardly changes, that is, the source relay UE is to function as the remote UE. During the process, in order to ensure continuity of respective services, the remote UE is to perform a relay reselection process, that is, reselecting a target relay UE in a coverage of an eNB to assist the remote UE to communicate with the eNB. The source relay UE is to perform a relay selection process, that is, selecting a relay UE in a coverage of an eNB to assist the source relay UE to communicate with the eNB.

In the two scenarios shown in FIG. 1(a) and FIG. 1(b), if traditional relay selection and relay reselection processes are performed, a specific problem occurs. In the scenario shown in FIG. 1(a), when the source relay UE completes the handover process, the remote UE reselects an initial source relay UE with a great probability due to a small relative speed and a short distance between the remote UE and the source relay UE. If this phenomenon often occurs, extra signaling overheads are generated for a network, and electric quantity losses of the source relay UE and the remote UE are generated. Therefore, service interruption of the source relay UE and the remote UE and great signaling overhead will influence the network greatly. In the scenario shown in FIG. 1(b), the relay reselection of the remote UE and the relay selection of the source relay UE need multiple times of measurement, consume much time and result in service interruption, therefore it is necessary to shorten the measurement time so as to reduce service interruption.

Figure 2:
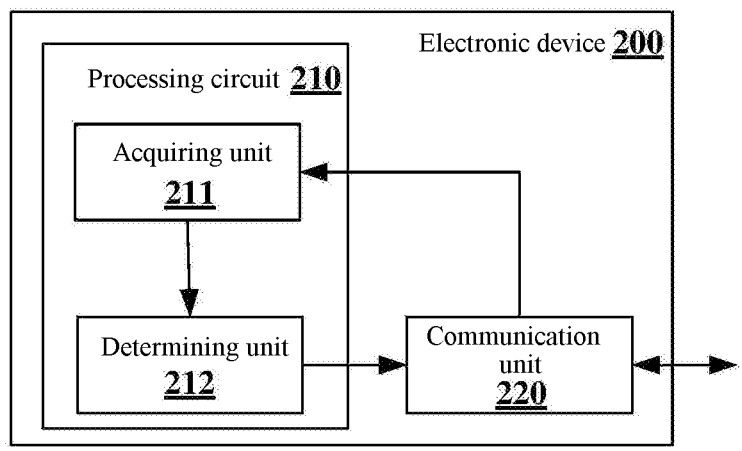
FIG. 2 is a block diagram showing a structure of an electronic device in a wireless communication system according to an embodiment of the present disclosure.

For the above technical problem, a technical solution according to the present disclosure is provided. FIG. 2 shows a structure of an electronic device 200 in a wireless communication system according to an embodiment of the present disclosure.

As shown in FIG. 2, the electronic device 200 may include a processing circuit 210. It should be noted that, the electronic device 200 may include one processing circuit 210 or multiple processing circuits 210. In addition, the electronic device 200 may include a communication unit 220 as a transceiver and so on.

Further, the processing circuit 210 may include various discrete functional units to perform different functions and/or operations. It should be noted that, the functional units may be physical entities or logical entities, and units with different names may be implemented by a same physical entity.

For example, as shown in FIG. 2, the processing circuit 210 may include an acquiring unit 211 and a determining unit 212.

In the electronic device 200 shown in FIG. 2, the acquiring unit 211 may acquire scenario identification information. The scenario identification information includes first link information indicating a quality of a link between the electronic device 200 and a user equipment in the wireless communication system, second link information indicating a quality of a link between the electronic device 200 and a base station in a serving cell providing a service for the electronic device 200 in the wireless communication system, received serving cell power change rate information and received neighbor cell power change rate information.

Based on the scenario identification information, the determining unit 212 determines a scenario where the electronic device is located to notify the user equipment, to assist the user equipment to perform a relay reselection process or assist the electronic device to perform the relay selection process.

The electronic device 200 according to the present disclosure may transmit scenario information on the electronic device 200 to a user equipment connected to the electronic device 200, and the electronic device 200 may assist the user equipment to perform a relay reselection process or the user equipment may assist the electronic device 200 to perform a relay selection process, thereby enhancing the relay reselection process of the user equipment and the relay selection process of the electronic device 200, and improving performance of the system.

According to the embodiment of the present disclosure, the wireless communication system may be an LTE-A cellular communication system, the electronic device 200 may be a source relay UE in the wireless communication system, the user equipment may be a remote UE in the wireless communication system, a link between the electronic device 200 and the user equipment is a PC5 link, and a link between the electronic device 200 and the base station is a Uu link. In addition, the first link information and the second link information indicating link qualities may be one or more of reference signal receiving power (RSRP), reference signal receiving quality (RSRQ), received signal strength indication (RSSI) and channel quality indication (CQI), or may be parameters indicating levels of one or more of RSRP, RSRQ, RSSI and CQI. The received neighbor cell power change rate information may be indicated by a variation of a power of a neighbor cell received by the electronic device 200 in a certain period. Similarly, the received serving cell power change rate information may be indicated by a variation of a power of a serving cell received by the electronic device 200 in a certain period.

According to the embodiment of the present disclosure, the first link information may be measured by the user equipment and is transmitted to the acquiring unit 211 of the electronic device 200. The electronic device 200 may receive the first link information by the communication unit 220. For example, the user equipment may measure and report the first link information periodically or triggered by event.

According to the embodiment of the present disclosure, the second link information, the received serving cell power change rate information and the received neighbor cell power change rate information may be measured by the acquiring unit 211 of the electronic device 200. For example, the acquiring unit 211 of the electronic device 200 may measure the above information periodically or triggered by event.

According to the embodiment of the present disclosure, in a case that the second link information indicates that the quality of the link between the electronic device 200 and the base station is less than a second threshold, the processing circuit 210 generates relay reselection trigger information to instruct the user equipment to perform the relay reselection process. For example, in a case that the electronic device 200 determines $RSRP_{Uu}$<threshold2 ($RSRP_{Uu}$ indicates the second link information, and threshold2 indicates a threshold for the second link information), it is indicated that the quality of the link between the electronic device 200 and the base station is poor. In this case, the communication unit 220 transmits relay reselection trigger information to the user equipment, to trigger the user equipment to perform the relay reselection process.

According to another embodiment of the present disclosure, the electronic device 200 may directly transmit the second link information to the user equipment, and the user equipment determines whether to perform the relay reselection process. In the embodiment, in order to save a signaling overhead, the electronic device 200 may quantify the second link information into different levels, and transmits the level information to the user equipment. For example, a "Uu link Quality Indicator" may be added at the electronic device 200 side to indicate the level of the second link information. Taking RSRP as an example, "Uu link Quality Indicator" information of 3 bits is used to indicate 8 levels of RSRP, and the level information is transmitted to the user equipment periodically or in response to an event. A mapping relation between RSRPs, RSRP levels and "Uu link Quality Indicator" is shown in the following table.

TABLE 1

| RSRP | RSRP level | Uu Link Quality indicator |
|---|---|---|
| RSRP ≤ RSRP0 | 1 | 000 |
| RSRP1 < RSRP ≤ RSRP2 | 2 | 001 |
| RSRP2 < RSRP ≤ RSRP3 | 3 | 010 |
| RSRP3 < RSRP ≤ RSRP4 | 4 | 011 |
| RSRP4 < RSRP ≤ RSRP5 | 5 | 100 |
| RSRP5 < RSRP ≤ RSRP6 | 6 | 101 |
| RSRP6 < RSRP ≤ RSRP7 | 7 | 110 |
| RSRP > RSRP7 | 8 | 111 |

In which, RSRP0 to RSRP7 each is threshold for RSRP.

According to the embodiment of the present disclosure, the determining unit 212 may receive scenario identification information from the acquiring unit 211, and determine scenario information on a scenario where the electronic device 200 is located based on the scenario identification information. Here, the scenario where the electronic device 200 is located includes a first scenario in which the electronic device 200 is to perform a handover process and a second scenario in which the electronic device 200 is to perform a relay selection process.

According to the embodiment of the present disclosure, the determining unit 212 may determine the scenario information by the following methods. In a case that $RSRP_{SPC5}$>threshold1, $RSRP_{Uu}$<threshold2 and $\Delta RSRP_n - \Delta RSRP_s$>threshold3, the determining unit 212 may determine that the electronic device 200 is in the first scenario in which the handover process is to be performed. In a case that $RSRP_{SPC5}$>threshold1, $RSRP_{Uu}$<threshold2 and $\Delta RSRP_n - \Delta RSRP_s$<threshold3, the determining unit 212 may determine that the electronic device 200 is in the second scenario in which the relay selection process is to be performed. In which, $RSRP_{SPC5}$ indicates the first link information, the $RSRP_{Uu}$ indicates the second link information, $\Delta RSRP_n$ indicates the received neighbor cell power change rate information, $\Delta RSRP_s$ indicates the received serving cell power change rate information, threshold 1 indicates a threshold for the first link information, threshold 2 indicates a threshold for the second link information, and threshold 3 indicates a threshold for a difference between a change rate of the received power of a neighbor cell and a change rate of the received power of a serving cell. The three thresholds may be set based on actual conditions of the system. In a case that the first link information is greater than threshold 1, it is indicated that a quality of the first link is good. In a case that the first link information is less than threshold1, it is indicated that a quality of the first link is poor. Similarly, in a case that the second link information is greater than threshold2, it is indicated that a quality of the second link is good. In a case that the second link information is less than threshold2, it is indicated that a quality of the second link is poor. In a case that the difference between the change rate of the received power of the neighbor cell and the change rate of the received power of the serving cell is greater than threshold3, it is indicated that in a certain period, a variation of the neighbor cell power received by the electronic device 200 is great and a variation of the serving cell power received by the electronic device 200 is small. That is, the electronic device 200 is located at an edge of the serving cell and is close to the neighbor cell. In a case that the difference between the change rate of the received power of the neighbor cell and the change rate of the received power of the serving cell is less than threshold3, it is indicated that in a certain period, a variation of the neighbor cell power received by the electronic device 200 is small and a variation of the serving cell power received by the electronic device 200 is great. That is, the electronic device 200 is located at an edge of the serving cell and there is no neighbor cell close enough around.

Here, when the determining unit 212 determines $RSRP_{SPC5}$>threshold1, it is indicated that a quality of a PC5 link is good. When the determining unit 212 determines $RSRP_{Uu}$<threshold2, it is indicated that a quality of a Uu link is poor. When the determining unit 212 determines $\Delta RSRP_n$-$\Delta RSRP_s$>threshold3, it is indicated that the electronic device 200 is located at an edge of the serving cell and is close to the neighbor cell, and thus the determining unit 212 can determine that the electronic device 200 is in the first scenario in which the handover process is to be performed. Similarly, when the determining unit 212 determines $RSRP_{SPC5}$>threshold1, it is indicated that a quality of the PC5 link is good. When the determining unit 212 determines $RSRP_{Uu}$<threshold2, it is indicated a quality of the Uu link is poor. When the determining unit 212 determines $\Delta RSRP_n$-$\Delta RSRP_s$<threshold3, it is indicated that the electronic device 200 is moving out of a coverage of the base station, and thus the determining unit 212 can determine that the electronic device 200 is in the second scenario in which the relay selection is to be performed.

According to the embodiment of the present disclosure, the acquiring unit 211 of the electronic device 200 may acquire $RSRP_{SPC5}$ from the user equipment via the communication unit 220, and the determining unit 212 determines whether to meet $RSRP_{SPC5}$>threshold1. According to another embodiment of the present disclosure, the user equipment may also directly determine whether a value of $RSRP_{SPC5}$ meets $RSRP_{SPC5}$>threshold1. Then, the user equipment feeds back the determined result to the acquiring unit 211 of the electronic device 200. Here, one bit of information "Distance Indicator" may be used to indicate the determined result. The "Distance Indicator" is maintained by the user equipment, and is reported to the electronic device 200 periodically or in response to an event. For example, in a case that "Distance Indicator" is equal to "1", it is indicated that $RSRP_{SPC5}$>threshold1. In a case that "Distance Indicator" is equal to "0", it is indicated that $RSRP_{SPC5}$<threshold1. In addition, in order to ensure accuracy of the measured result, the "Distance Indicator" may be set as "1" when N1 (N1 is a natural number) events of $RSRP_{SPC5}$>threshold1 occur continuously; and the "Distance Indicator" is set as "0", when N2 (N2 is a natural number) events of $RSRP_{SPC5}$<threshold1 occur continuously. In a case that none of the above two types of events occurs, a value of the "Distance Indicator" is set as the same as that reported to the electronic device 200 last time.

According to the embodiment of the present disclosure, when the determining unit 212 of the electronic device 200 determines the scenario information on the scenario in which the electronic device 200 is located, the user equipment is notified of the scenario information via the communication unit 220, such that the electronic device 200 assists the user equipment to perform the relay reselection process in the first scenario, or the user equipment assists the electronic device 200 to perform the relay selection process in the second scenario. Here, one bit information of "Scenario Indicator" may be added to indicate the scenario information. The "Scenario Indicator" is maintained by the electronic device 200, and is transmitted to the user equipment periodically or in response to an event. For example, in a case that the "Scenario Indicator" is equal to "0", it is indicated that the electronic device 200 is in the first scenario. In a case that the "Scenario Indicator" is equal to "1", it is indicated that the electronic device 200 is in the second scenario. In a case that the "Scenario Indicator" is null, it is indicated that the electronic device 200 is in a scenario other than the first scenario and the second scenario.

Here, the communication unit 220 of the electronic device 200 may combine and transmit the relay reselection trigger information and the scenario information, or transmit the relay reselection trigger information or the scenario information separately.

Figure 3:
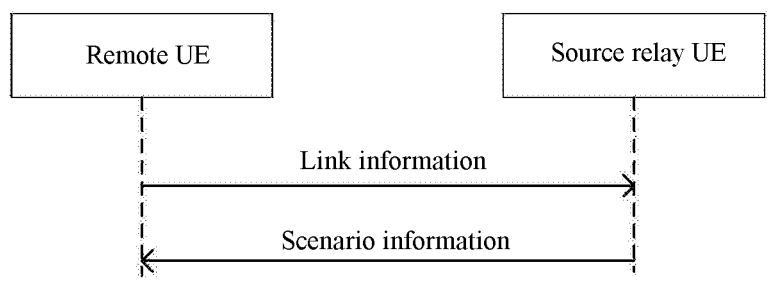
FIG. 3 is a flowchart showing signaling interaction between a source relay user equipment and a remote user equipment in a wireless communication system according to an embodiment of the present disclosure.

FIG. 3 is a flowchart of signaling interaction performed between a source relay user equipment and a remote user equipment in a wireless communication system according to an embodiment of the present disclosure.

As shown in FIG. 3, a remote UE reports a first link information indicating a quality of a link between the remote UE and the source relay UE to the source relay UE. After determining a scenario where the source relay UE is located, the source relay UE notifies the remote UE of the scenario information.

Figure 4:
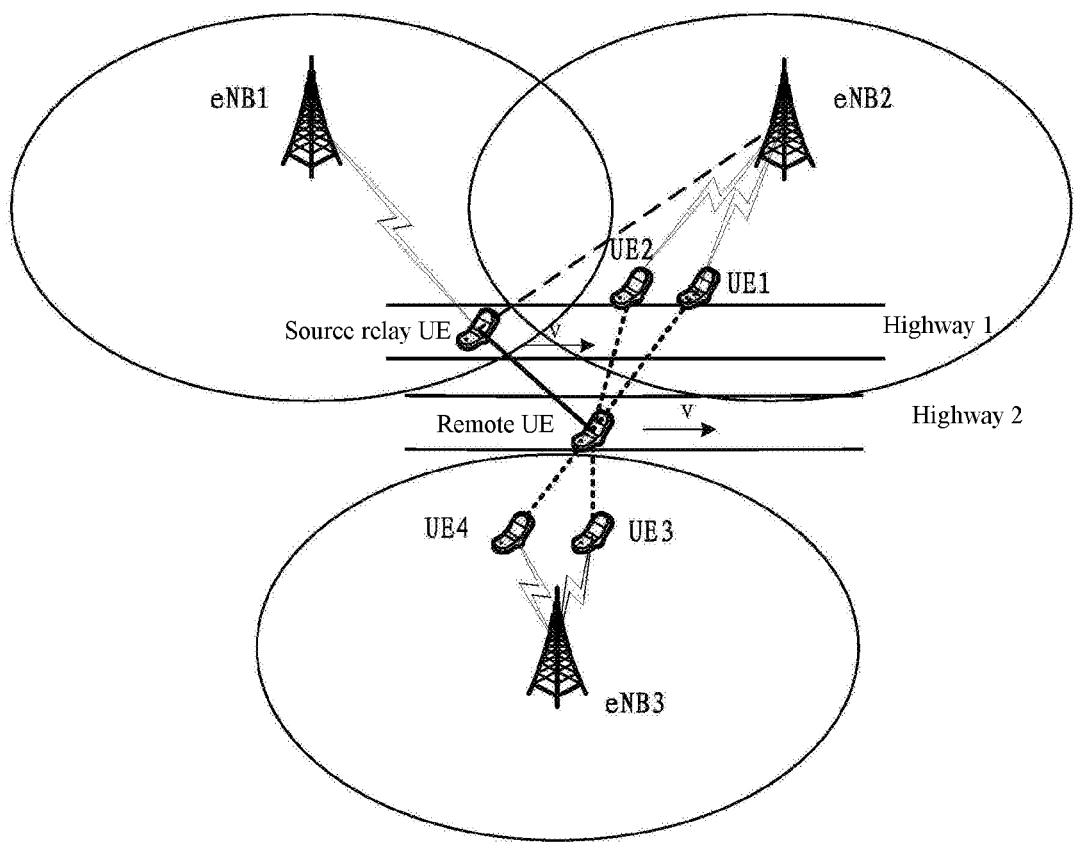
FIG. 4 is a schematic diagram showing a scenario in which a source relay user equipment in a wireless communication system assists a remote user equipment to perform relay reselection according to an embodiment of the present disclosure.

FIG. 4 is a schematic diagram showing a scenario in which a source relay user equipment assists a remote user equipment to perform relay reselection in a wireless communication system according to an embodiment of the present disclosure.

As shown in FIG. 4, the source relay UE is in a first scenario in which a handover process is to be performed. As described above, the source relay UE and the remote UE move in two parallel highways. In order to ensure continuity of respective services, the source relay UE is to perform the handover process, i.e., switching to a cell covered by an eNB2, and the remote UE is to perform a relay reselection process, i.e., reselecting a target relay UE in a coverage of another eNB. Here, UE1 and UE2 in the coverage of the eNB2 and UE3 and UE4 in the coverage of the eNB3 each may function as the target relay UE of the remote UE. The remote UE may reselect one of the four UEs according to a certain rule, and communicates with the eNB2 or the eNB3 via the target relay UE.

Practically, when the source relay UE completes the handover process, the remote UE may reselect the initial source relay UE with a great probability due to a small relative speed and a close distance between the remote UE and the source relay UE. In this case, if the remote UE reselects the UE3 or the UE4 as the target relay UE, the eNB1 needs to transmit contexts of the remote UE and the source relay UE to the eNB3 via an X2 interface. When the source relay UE completes the handover process, the remote UE reselects the initial source relay UE, and the eNB3 needs to transmit contexts of the remote UE and the UE3 or UE4 to the eNB2 via an X2 interface. During the process, the context of the remote UE is transmitted between the eNBs via the X2 interface for two times, thereby increasing an overhead of the system. Alternatively, if the remote UE reselects the UE1 or the UE2 as the target relay UE, the eNB1 needs to transmit contexts of the remote UE and the source relay UE to the eNB2 via the X2 interface. When the source relay UE completes the handover process, the remote UE reselects the initial source relay UE. The source relay UE is in the coverage of the eNB2, therefore no context of the remote UE is to be transmitted, thereby saving the overhead of the system. Therefore, it is expected to reselect the UE1 or UE2 by the remote UE during the relay reselection process, that is, it is expected that a final target cell providing a service for the remote UE is the eNB2.

In order to solve the above technical problems, according to the embodiment of the present disclosure, the processing circuit 210 may be further configured to perform operations of: acquiring Time to Trigger (TTT) length information indicating a length of TTT of a running event A3 or received neighbor cell signal quality information; determining candidate target cells for the user equipment based on the TTT length information or information indicating a quality of a received signal of a neighbor cell; and setting a bias value for each of the candidate target cells to assist the user equipment to select, from the candidate target cells, a final target cell providing a service for the user equipment.

According to the embodiment of the present disclosure, when the source relay UE triggers the remote UE to perform a relay reselection process, TTT of N1 (N1 is a natural number) events A3 is in a running state for the source relay UE. The electronic device 200 (such as a selection unit of the electronic device 200, not shown) may acquire information on the TTT lengths, sort the TTT in a descending order according to the lengths, and select the first N2 TTTs, and use cells corresponding to the N2 TTTs as candidate target cells of the user equipment. When the source relay UE triggers the remote UE to perform the relay reselection process, there is no TTT in the running state for the source relay UE. The electronic device 200 (such as a selection unit of the electronic device 200, not shown) may acquire the information indicating a quality of the received signal of the neighbor cell, sort the neighbor cells in a descending order according to the received neighbor cell signal qualities, and select the first N2 received signal qualities, and use cells corresponding to the N2 received signal qualities as candidate target cells of the user equipment. Here, N2 is a natural number which may be configured based on actual conditions of the system. If N1<N2, cells corresponding to N1 TTTs or N1 received neighbor cell signal qualities are used as the candidate target cells. According to the embodiment of the present disclosure, the received neighbor cell signal quality information may be one or more of RSRP, RSRQ, RSSI and CQI.

According to the embodiment of the present disclosure, the electronic device 200 (such as a setting unit in the electronic device 200, not shown) may set a bias value for each of the candidate target cells. UEs in a coverage of the same candidate target cell have the same bias value. For example, in the example shown in FIG. 4, if the eNB2 and the eNB3 each is candidate target cells of the remote UE, the UE1 and the UE2 have the same bias value, and the UE3 and the UE4 have the same bias value.

According to the embodiment of the present disclosure, the bias value of the candidate target cell is set based on the TTT length information or the received neighbor cell signal quality information. For example, with increasing of the TTT length or the received neighbor cell signal quality, the bias value of the cell corresponding to the TTT length or the received neighbor cell signal quality increases.

According to the embodiment of the present disclosure, the electronic device 200 (such as a setting unit in the electronic device 200, not shown) may maintain a mapping table between bias values and TTT lengths or received neighbor cell signal qualities, as shown in table 2. In table 2, the received neighbor cell signal quality is indicated by RSRP, and the received neighbor cell signal quality may be indicated by other parameters similarly, such as RSRQ, RSSI or CQI.

TABLE 2

| TTT length/received neighbor cell signal quality | Bias value |
|---|---|
| TTT0---TTT1/RSRP0---RSRP1 | Bias1 |
| TTT1---TTT2/RSRP1---RSRP2 | Bias2 |
| TTT2---TTT3/RSRP2---RSRP3 | Bias3 |
| . . . | . . . |

In table 2, TTT0, TTT1, TTT2, TTT3, . . . , (in an ascending order) are some thresholds for the TTT length, and RSRP0, RSRP1, RSRP2, RSRP3, . . . , (in an ascending order) are some thresholds for the received neighbor cell signal quality. Bias1, Bias2, Bias3, . . . , (in an ascending order) are bias values. The electronic device 200 (such as a setting unit in the electronic device 200, not shown) may query the mapping table based on different TTT lengths or received neighbor cell signal qualities to generate different bias values.

Subsequently, according to the embodiment of the present disclosure, the electronic device 200 may transmit a cell identification (ID) of the candidate target cell and a corresponding bias value to the remote UE via the communication unit 220. Here, the cell ID of the candidate target cell and the corresponding bias value may be transmitted to the remote UE together with the scenario information and/or the relay reselection trigger information, or separately from the scenario information and/or the relay reselection trigger information. In other words, the cell ID of the candidate cell, the corresponding bias value, and the scenario information and the relay reselection trigger information may be transmitted in any combination, or may be transmitted separately.

According to the embodiment of the present disclosure, when the remote UE receives the cell ID of the candidate target cell and the corresponding bias value from the electronic device 200, the remote UE may determine a target relay UE from the candidate target cells based on the bias value.

According to the embodiment of the present disclosure, the remote UE may determine the target relay UE from the candidate target cell by using the three methods in the following.

First Method

In the embodiment, the remote UE may set a priority of a candidate target cell based on a size of the bias value; and performs a relay reselection process on a candidate target relay UE in the candidate target cells based on the priority of the candidate target cell, until the target relay UE is determined.

For example, the remote UE may set a high priority for a candidate target cell with a great bias value, and set a low priority for a candidate target cell with a small bias value. Then, the remote UE ranks candidate target cells in a descending order of the priorities, and measures a quality of a PC5 link between the remote UE and a candidate target relay UE in the candidate target cells sequentially in the order. In a case that the quality of the PC5 link between the remote UE and the candidate target relay UE in the candidate target cell meets the access condition, measuring is stopped, and a candidate target relay UE in the candidate target cell is directly selected as the target relay UE.

According to the first method, the bias value is proportional to the TTT length or the received neighbor cell signal quality and the remote UE determines the target relay UE based on the bias value, therefore the method is easy to be implemented. In addition, the target relay UE determined by the remote UE is located in a cell to which the source relay UE is to switch with a greater probability, such that the source relay UE does not need to transmit context information of the remote UE via the X2 interface when completing the handover process, thereby saving the signaling overhead and simplifying the handover process.

Second Method

In the embodiment, the remote UE may acquire a link quality value indicating a quality of a link between the remote UE and a candidate target relay UE in the candidate target cell, and select the target relay UE based on the link quality value and a bias value. For example, the remote UE adds a bias value corresponding to the candidate target cell to the link quality value corresponding to the candidate target relay UE in the candidate target cell, to obtain an adjusted link quality value; and performs the relay reselection process based on the adjusted link quality value.

Here, the remote UE measures a quality of a PC5 link between the remote UE and the candidate target relay UE in all candidate target cells, adds a bias value corresponding to the candidate target cell to the link quality value to obtain an adjusted link quality value, and selects a cell with the maximum adjusted link quality value from all the candidate target cells as the target relay UE.

According to the second method, both the bias value and the quality of the PC5 link are considered, therefore the determined target relay UE is located in a cell to which the source relay UE is to switch with a greater probability, and the determined result is more accurate.

Third Method

In the embodiment, the remote UE may acquire a link quality value indicating a quality of a link between the remote UE and a candidate target relay UE in candidate target cells. The remote UE may further acquire a link quality value indicating a quality of a link between the candidate target relay UE in the candidate target cells and its serving base station, and selects a target relay UE based on the link quality value indicating the quality of the link between the remote UE and the candidate target relay UE in the candidate target cells, the link quality value indicating the quality of the link indicating the candidate target relay UE in the candidate target cells and the serving base station, and a bias value. For example, the remote UE adds a bias value corresponding to the candidate target cell, the link quality value indicating a quality of a link between the remote UE and the candidate target relay UE in the candidate target cells and the link quality value indicating a quality of a link between the candidate target relay UE in the candidate target cell and the serving base station, to obtain an adjusted link quality value; and performs a relay reselection process based on an adjusted link quality value.

Here, the remote UE measures a quality of a PC5 link between the remote UE and the candidate target UE in all candidate target cells. The candidate target relay UE in the candidate target cell may measure a quality of a Uu link between the candidate target relay UE and the serving base station, and adds the PC5 link quality value, the Uu link quality value and a bias value corresponding to the candidate target cell to obtain an adjusted link quality value. A cell with the maximum adjusted link quality value is selected from all the candidate target cells as the target relay UE.

According to the third method, the bias value, the PC5 link quality and the Uu link quality are all considered, and thus the determined result is more accurate It should be noted that, the above three methods for determining the target relay UE may be used individually or in combination. For example, when no target relay UE meeting the access condition is found with the first method, and the target relay UE is searched for continuously with the second method or the third method.

According to the embodiment of the present disclosure, the bias value is proportional to the TTT length or the received neighbor cell signal quality and the remote UE determines the target relay UE based on the bias value, therefore the target relay UE determined by the remote UE is located in a cell to which the source relay UE is to switch with a greater probability, such that the source relay UE does not need to transmit context information of the remote UE via the X2 interface when completing the handover process, thereby saving the signaling overhead and simplifying the handover process.

Figure 5:
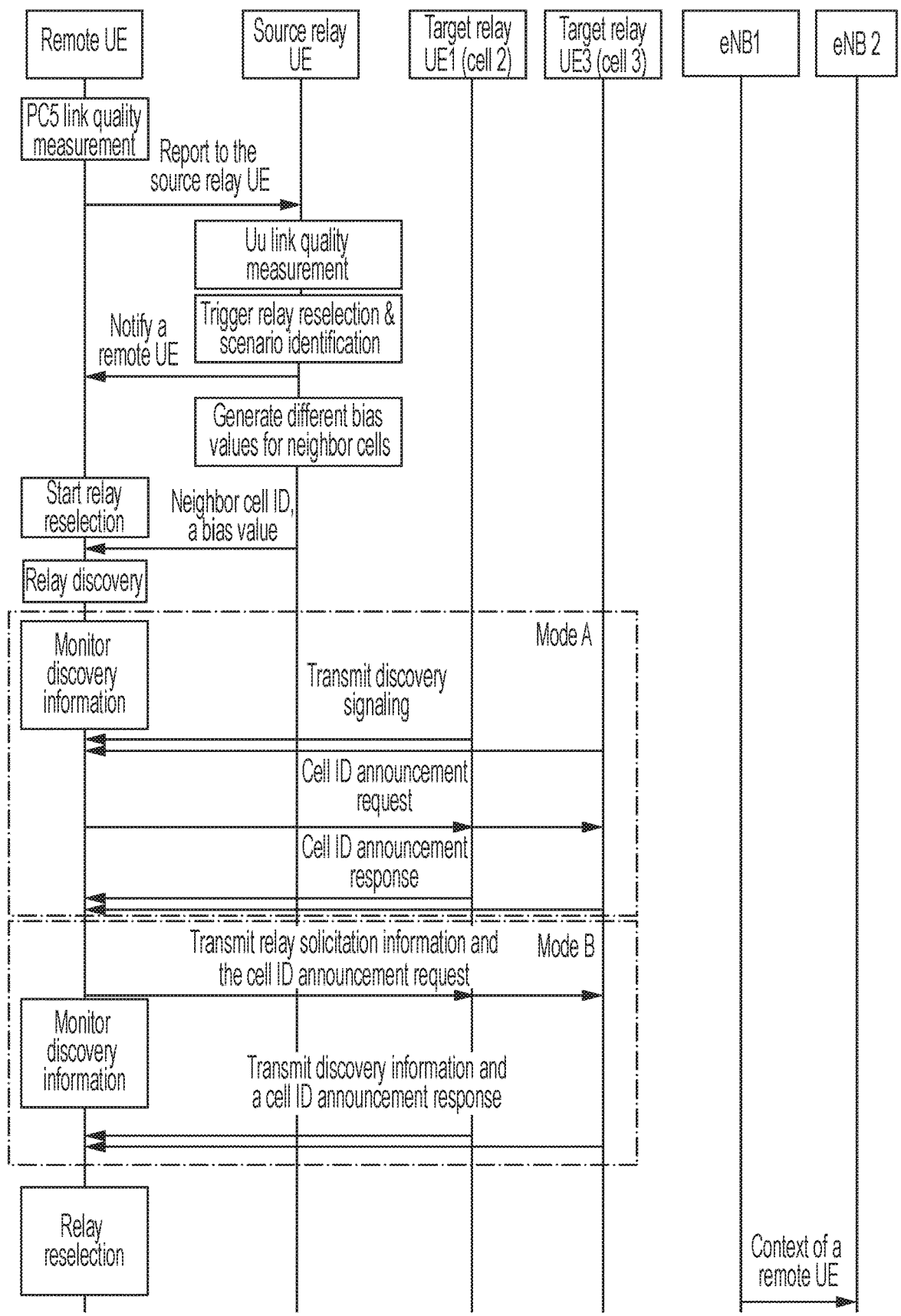
FIG. 5 is a flowchart showing signaling interaction that an electronic device in a wireless communication system assists a remote user equipment to perform relay reselection according to an embodiment of the present disclosure.

FIG. 5 is a flowchart showing signaling interaction in which an electronic device in a wireless communication system assists a remote user equipment to perform relay reselection according to an embodiment of the present disclosure. As shown in FIG. 5, the remote UE measures a quality of a PC5 link and reports the measured PC5 link quality to a source relay UE. The source relay UE measures a quality of a Uu link, and then identify a scenario and determines whether to trigger a relay reselection process. Subsequently, if it needs to trigger the relay reselection process, the source relay UE notifies the remote UE of relay reselection trigger information and scenario information. Subsequently, if the source relay UE is in a first scenario in which a handover is to be performed, the source relay UE determines candidate target cells for the user equipment, and sets a bias value for each of the candidate target cells. Subsequently, the source relay UE transmits a cell ID of the candidate target cell and a corresponding bias value to the remote UE. Subsequently, the remote UE performs a relay discovery process. Taking target relay UE1 and UE3 as an example, in a mode A, the remote UE monitors discovery information, the target relay UE1 and UE3 transmit a discovery instruction to the remote UE, the remote UE transmits a cell ID announcement request to the UE1 and the UE3, and the UE1 and the UE3 transmit cell ID announcement responses to the remote UE. In a mode B, the remote UE transmits relay solicitation information and a cell ID announcement request to the UE1 and the UE3, and then monitors discovery information. The UE1 and the UE3 transmits discovery information and cell ID announcement responses to the remote UE. Subsequently, the remote UE performs the relay reselection process based on the bias value. Here, since the eNB2 has a longer TTT length than the eNB3 or has a better received signal quality than the eNB3, the bias value of the eNB2 is greater than that of the eNB3, therefore the remote UE selects the UE1 as a final target relay UE with a greater probability. Subsequently, the eNB1 transmits a context of the remote UE to the eNB2, and the process ends.

According to the embodiment of the present disclosure, in a case that the second link information indicates that a quality of a link between the electronic device 200 and a base station is less than a second threshold, the processing circuit 210 is further configured to perform an operation of: acquiring a speed adjustment factor of the electronic device 200 to instruct the user equipment to adjust a hysteresis parameter of the user equipment.

In an LTE system, an event for triggering handover generally needs to have a certain hysteresis effect to prevent the link quality from instantaneous increasing or decreasing due to fast attenuation change. In addition, in order to ensure service continuity of different users, the hysteresis factor is variable. In the LTE network, according to the mobility management mechanism, different hysteresis factors are set for different user speeds, and influence caused by the hysteresis factor is adjusted by the speed adjustment factor speedstatescalefactor. The speedstatescalefactor is defined as follows in 3GPP TS36.300.

```
SpeedStateScaleFactors information element
--ASN1START
SpeedStateScaleFactors ::=      SEQUENCE{
    sf-Medium                   ENUMERATED {oDot25, oDot5, oDot75, IDot0},
    sf-High                     ENUMERATED {oDot25, oDot5, oDot75, IDot0}
}
-ASN1STOP
```

According to the embodiment of the present disclosure, the remote UE performs communication with a base station through a relay UE, therefore the serving quality of the remote UE is determined by the PC5 link quality together with the Uu link quality. The remote UE is triggered to perform the relay reselection process in a case that the quality of either of the two links is decreased, therefore it is unreasonable to adjust the hysteresis factor based on only a moving speed of the relay UE or the remote UE. According to the embodiment of the present disclosure, different adjustment parameters are configured for the remote UE according to different scenarios to adjust the hysteresis factor, thereby improving continuity of the service.

According to the embodiment of the present disclosure, in a case that the second link information indicates that a quality of a link between the electronic device 200 and the base station is less than a second threshold, the electronic device 200 may notify the remote UE of a speed adjustment factor of the electronic device 200, to instruct the remote UE to adjust a hysteresis factor of the remote UE based on the speed adjustment factor of the electronic device 200. Here, the speed adjustment factor may be transmitted to the remote UE together with the candidate target cell ID and the bias value, or may be transmitted to the remote UE separately from the candidate target cell ID and the bias value.

According to the embodiment of the present disclosure, when the remote UE receives the speed adjustment factor of the relay UE, the remote UE may further acquire link change information indicating a change rate of the quality of the link between the remote UE and the relay UE, and adjusts the hysteresis factor of the remote UE based on the speed adjustment factor of the relay UE and/or the link change information.

According to the embodiment of the present disclosure, the remote UE may measure a quality of a PC5 link between the remote UE and the relay UE, and determines a change rate of the PC5 link quality. Here, the remote UE may determine the change rate of the PC5 link quality according to the following method. In a case that N1 (N1 is a natural number) events of $\Delta RSRP_{SPC5}$>threshold1 occur continuously, the remote UE determines that the change rate of the PC5 link quality is great. In a case that N2 (N2 is a natural number) events of $\Delta RSRP_{SPC5}$<threshold2 occur continuously, the remote UE determines that the change rate of the PC5 link quality is small. In a case that neither of the two types of events occurs, the remote UE determines that the change rate of the PC5 link quality is the same as the previous result. In which, $\Delta RSRP_{SPC5}$ indicates a difference of two sequential measurement results of the PC5 link quality, and threshold1 and threshold2 indicate thresholds for $\Delta RSRP_{SPC5}$. In a case that neither of the above two types of events occurs, it is determined that the change rate of the PC5 link quality is the same as the previous determination result. The change rate of the PC5 link quality reflects a relative speed between the remote UE and the relay UE.

According to the embodiment of the present disclosure, the remote UE may adjust the hysteresis parameter of the remote UE according to the following method. In a case that the PC5 link quality is good and the Uu link quality is poor, the relay reselection process is triggered mainly by the Uu link, that is, the relay reselection process is triggered by mobility of the source relay UE. In this case, the remote UE may adjust the hysteresis factor of the remote UE based on a speed adjustment factor of the source relay UE. Here, the remote UE may adjust the hysteresis parameter according to any well-known method in the art. For example, the speed adjustment factor of the relay UE is multiplied by the hysteresis factor of the remote UE, and a generated product functions as an adjusted hysteresis parameter. When the Uu link quality is good and the PC5 link quality is poor, the relay reselection process is triggered mainly by the PC5 link, that is, the relay reselection process is triggered based on relative moving between the source relay UE and the remote UE. In this case, the remote UE may adjust the hysteresis factor of the remote UE based on the change rate of the PC5 link quality. When both the Uu link quality and the PC5 link quality are poor, the remote UE may adjust the hysteresis factor according to both the speed adjustment factor of the source relay UE and the change rate of the PC5 link quality.

According to the embodiment of the present disclosure, the hysteresis factor of the remote UE is not adjusted based on only the moving speed of the relay UE or the remote UE. Different adjustment parameters are configured for the remote UE according to different scenarios to adjust the hysteresis factor, thereby improving the adjustment accuracy and improving continuity of the service.

As described above, when the source relay UE completes handover, the remote UE may reselect the initial source relay UE again. Therefore, in order to avoid extra signaling overhead, the processing circuit 210 of the electronic device 200 may generate handover indication information to be transmitted to the remote UE, when the handover process is completed. In addition, a timer $T_{bmb}$ may be maintained at a remote UE side. The timer $T_{bmb}$ is configured to start timing when a connection between the remote UE and a target relay UE is established. During a process in which the source relay UE performs the handover, the remote UE does not disconnect from the source relay UE, that is, the remote UE is in a state of "dual connection". When the timer expires or the remote UE receives the handover indication information from the source relay UE, the remote UE reselects a final relay link connection, that is, the remote UE selects to disconnect from the source relay UE or the target relay UE. If the remote UE selects to disconnect from the source relay UE, the remote UE communicates with the base station via the target relay UE. If the remote UE selects to disconnect from the target relay UE, the remote UE communicates with the base station via the source relay UE.

The timer $T_{bmb}$ is used to ensure that the remote UE is not disconnected from the source relay UE before the source relay UE completes the handover, therefore duration setting of the timer $T_{bmb}$ is closely related to a duration of the handover process.

Figure 6:
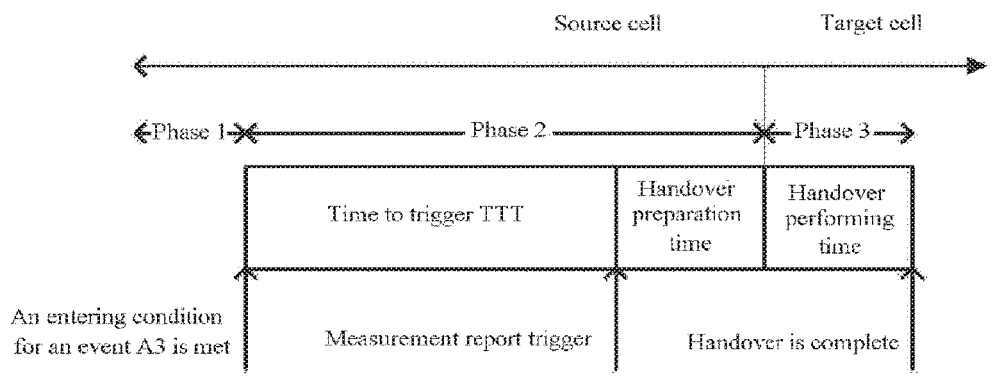
FIG. 6 is a schematic diagram showing a handover process based on an event A3 according to an embodiment of the present disclosure.

FIG. 6 is a schematic diagram showing a handover process based on an event A3 according to an embodiment of the present disclosure. As shown in FIG. 6, in a case that an entering condition for the event A3 is met, it starts to perform the handover after a Time To Trigger TTT and handover prepare time, and the handover is completed after handover performing time. A value of TTT is configured by the base station based on different parameters, the handover prepare time is about 40 ms, and the handover performing time is about 50 ms. Therefore, the remote UE may determine a duration of the timer $T_{bmb}$ according to the following equation.

$$T_{bmb}=TTT+50\ ms+40\ ms+\Delta$$

In which, Δ indicates a margin which may be set according to actual conditions of the system, to ensure that the handover process can be completed when the timer $T_{bmb}$ expires.

According to the embodiment of the present disclosure, the processing circuit 210 is further configured to perform operations of: performing a handover process; and generating handover indication information to instruct the user equipment to select a final relay link connection. The handover indication information indicates a result of performing the handover process. As described above, the remote UE is connected to both the source relay UE and the target relay UE before the source relay UE completes the handover, therefore the user equipment may determine to disconnect from which relay UE based on the handover indication information generated by the electronic device 200, to select the final relay link connection.

According to the embodiment of the present disclosure, the handover indication information transmitted to the remote UE by the electronic device 200 may include a success of handover process, that is, the handover is completed or the RRC reestablishment is completed.

Figure 7:
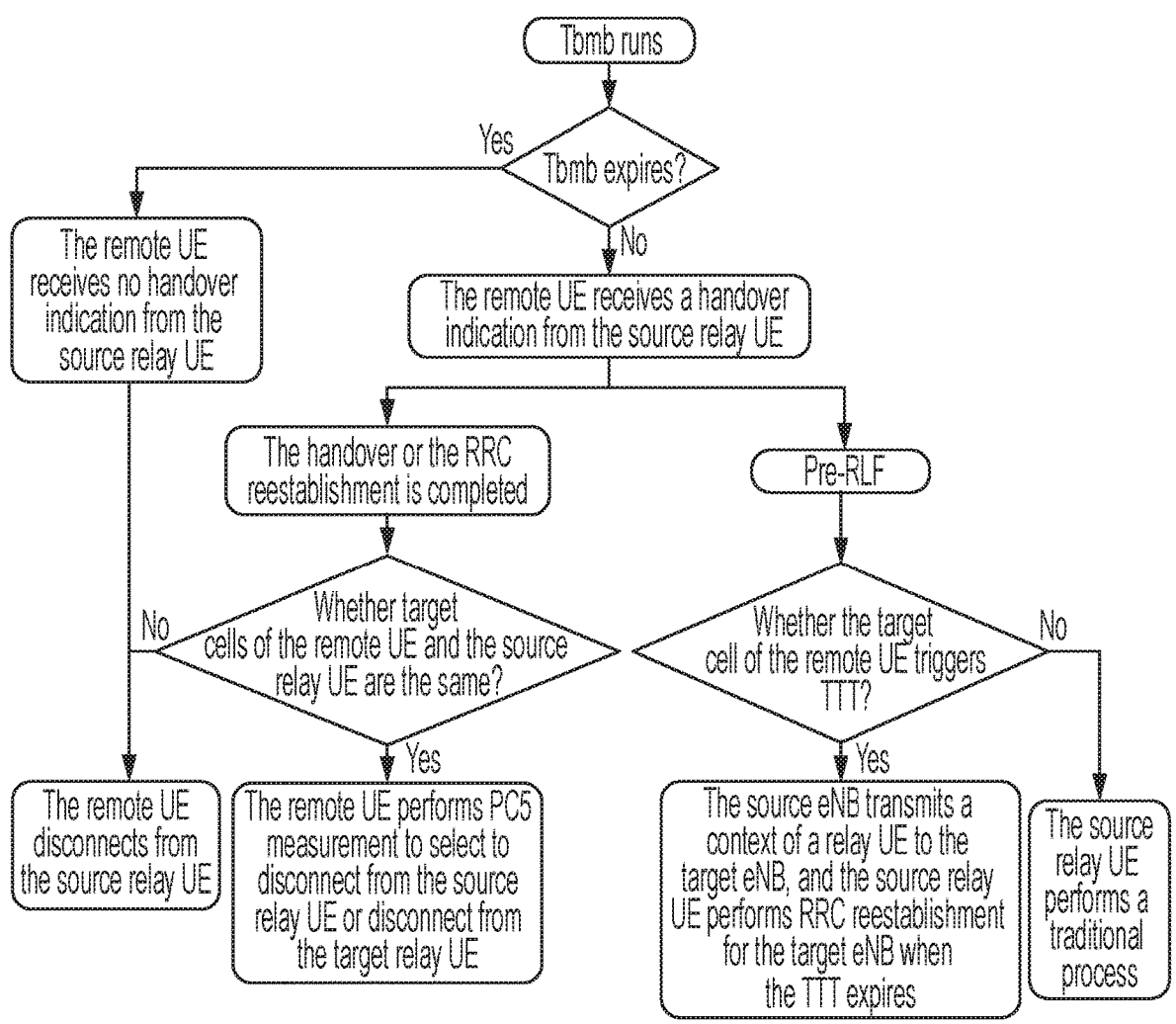
FIG. 7 is a schematic diagram showing a process that a remote user equipment determines a final relay link and a relay user equipment performs a quick radio link recovery process according to an embodiment of the present disclosure.

FIG. 7 is a schematic diagram showing a process in which a remote user equipment determines a final relay link and a relay user equipment performs a quick radio link recovery according to an embodiment of the present disclosure.

As shown in FIG. 7, in a case that the remote UE receives handover indication information indicating completing of handover or RRC reestablishment from a source relay UE during an operation of the $T_{bmb}$ and the handover indication information carries a target cell ID of the source relay UE, the remote UE acquires a target cell ID of the source relay UE and compares the target cell ID of the source relay UE with a serving cell ID of a target relay UE.

Subsequently, if the target cell ID of the source relay UE is the same as the serving cell ID of the target relay UE, it is indicated that the source relay UE and the remote UE move to a coverage of a same target cell, and their contexts are stored in a same base station. Subsequently, before the timer $T_{bmb}$ expires, the remote UE measures a quality of a link between the remote UE and the source relay UE again, to obtain updated first link information. If the quality value of the link between the remote UE and the source relay UE is always greater than a predetermined threshold, it is indicated that the quality of the link between the remote UE and the source relay UE is good; and when the timer $T_{bmb}$ expires, the remote UE is disconnected from the target relay UE, and communicates with the base station via the source relay UE. If the quality value of the link between the remote UE and the source relay UE is not always greater than the predetermined threshold, it is indicated that the quality of the link between the remote UE and the source relay UE is poor, the remote UE disconnects from the source relay UE and communicates with the base station via the target relay UE.

Alternatively, if the target cell ID of the source relay UE is different from an ID of a cell where the target relay UE is located, it is indicated that contexts of the source relay UE and the remote UE are stored in different base stations. In this case, it is unnecessary to wait for the expiration of the timer Tbmb, the remote UE directly disconnects from the source relay UE and communicates with the base station via the target relay UE.

In addition, if the remote UE does not receive any handover indication information when the timer $T_{bmb}$ expires, the remote UE directly disconnects from the source relay UE and communicates with the base station via the target relay UE.

According to the embodiment of the present disclosure, based on the handover indication information indicating completing of handover or RRC reestablishment, the remote UE may select a more appropriate link connection from links of the source relay UE and the target relay UE, thereby obtaining a better service quality.

Practically, the handover process of the source relay UE is not always successful. If the handover process of the source relay UE fails, handover indication information may also be transmitted to the remote UE. That is, the handover indication information transmitted to the remote UE by the electronic device 200 may include a failure of the handover process.

In an LTE-A system, the radio link failure may be regarded as "physical layer interruption". The UE estimates a channel quality based on a cell-specific Reference Signal (CRS), and compares with preset reference threshold $Q_{out}$ and $Q_{in}$. If a measurement value is less than $Q_{out}$, the UE determines that a current link is in an out-of-sync state. In a case that the measure value is higher than $Q_{in}$, the UE determines that the current link is in an In-sync state. When the UE determines that the current link is in the out-of-sync state, a counter T310 is triggered. During an operation of the counter T310, no in-sync event occurs, the UE will announce that a radio link failure (RLF) occurs, and reports the event to the base station. The counter T310 is generally set as 1 s, and a period of a layer 3 (L3) filter is 200 ms. It follows that, the UE reports the RLF event only if 5 out-of-sync events occur, thereby increasing interruption time while preventing "immature" RLF. In the other aspect, after the RLF occurs, the UE starts an RRC reestablishment process. The RRC connection between the UE and the target cell may be reestablished possibly only if the source cell determines that the UE needs to perform handover and the source cell transmits a context of the UE to a target cell. The traditional RRC reestablishment consumes much time, thereby resulting in interruption between the UE and the base station for long time and influencing a system performance and a user experience.

In order to solve the above technical problems, a "Pre-RLF" event and a counter $T_{RLF}$ maintained at a source relay UE side are defined in the present disclosure. Here, the counter $T_{RLF}$ is used to count the number of out-of-sync events occurring continuously. The counter $T_{RLF}$ counts according to the following rule. The counter $T_{RLF}$ is reset as zero once an in-sync event occurs, and the counter $T_{RLF}$ adds 1 once an out-of-sync event occurs, as shown in table 3.

TABLE 3

| Previous event | Current event | TRLF |
| --- | --- | --- |
| Out-of-sync | In-sync | reset |
| Out-of-sync | Out-of-sync | +1 |
| In-sync | Out-of-sync | +1 |
| In-sync | In-sync | maintaining as zero |

According to the embodiment of the present disclosure, when a value of the counter $T_{RLF}$ is N5 (1<N5<5), it is defined that the "Pre-RLF" event occurs. Here, N5 may be configured and transmitted to the source relay UE by the base station, or may be configured by the source relay UE based on a speed adjustment factor of the source relay UE.

According to the embodiment of the present disclosure, in a case that the handover indication information indicates a failure of the handover process, the processing circuit 210 is further configured to perform operations of: acquiring a cell identification of a final target cell providing a service for the user equipment after the relay reselection process is performed; determining that the final target cell already causes Time To Trigger TTT of a running event A3, to notify the base station of handover process failure and the cell identification of the final target cell; and performing a radio link recovery process when the Time To Trigger TTT of the running event A3 caused by the final target cell expires, such that the electronic device 200 is connected to the final target cell.

According to the embodiment of the present disclosure, the handover indication information generated by the source relay UE may include a "Pre-RLF" indication for indicating occurrence of the "Pre-RLF" event, that is, indicating that the handover process fails. As shown in FIG. 7, during the operation of $T_{bmb}$, if the remote UE receives the "Pre-RLF" indication transmitted from the source relay UE, an ID of a cell to which the target relay UE belongs is reported to the source relay UE. Subsequently, the source relay UE determines whether the cell to which the target relay UE belongs triggers TTT. If the cell to which the target relay UE belongs triggers the TTT, it is indicated that the source relay UE is to switch to the cell to which the target relay UE belongs, the source relay UE transmits the "Pre-RLF" indication and the ID of the cell to which the target relay UE belongs to a serving base station of the source relay UE. Subsequently, the serving base station of the source relay UE transfers a context of the source relay UE to the cell to which the target relay UE belongs. When the TTT expires, the source relay UE performs quick radio link recovery and is reconnected to the target cell. If the cell to which the target relay UE belongs does not trigger the TTT, the source relay UE performs the traditional handover process continuously.

In this manner, the source relay UE can perform quick RRC reestablishment of the target cell, thereby shortening the RRC reestablishment time, and thus reducing the interruption time and improving the system performance.

As described above, in a case that $RSRP_{SPC5}$>threshold1, $RSRP_{Uu}$<threshold2 and $\Delta RSRP_n - \Delta RSRP_s$<threshold3, the determining unit 212 may determine that the electronic device 200 is in the second scenario in which the relay selection process is to be performed. In the scenario, the electronic device 200 may transmit a bias value to the remote UE, and in this case, the bias value is "null".

In the scenario, the quality of the PC5 link between the source relay UE and the remote UE is good, it is indicated that the source relay UE is close to the remote UE, therefore a target relay UE on which the remote UE performs relay reselection is close to the source relay UE. That is, the target relay UE on which the source relay UE performs relay selection may be a target relay UE on which the remote UE performs relay reselection to a great extent. In this case, if the source relay UE performs a traditional relay selection process, multiple times of measurement is performed and much time is consumed. If the remote UE assists the source relay UE to access to the target relay UE of the remote UE, a lot of time and overhead can be saved.

According to the embodiment of the present disclosure, the processing circuit 210 of the electronic device 200 may be further configured to perform operations of: acquiring target relay information on the target relay UE obtained after the remote UE performs the relay reselection process; and performing the relay selection process. When performing the relay selection process, the processing circuit 210 is further configured to perform operations of: monitoring a discovery message of the target relay UE indicated by the target relay information with a priority; determining that a quality of the link between the target relay UE and the electronic device 200 is greater than a predetermined threshold; and establishing a relay connection between the target relay UE and the electronic device 200.

According to the embodiment of the present disclosure, the remote UE may transmit the target relay UE information obtained after performing the relay reselection process to the source relay UE, to assist the source relay UE to perform the relay selection process. After acquiring the information on the target relay UE, the source relay UE monitors a discovery message of the target relay UE with a priority during the process of performing relay selection. If the quality of the PC5 link between the source relay UE and the target relay UE is good, the source relay UE establishes a connection with the target relay UE.

According to the embodiment of the present disclosure, in a case that there are two or more remote UEs connecting to the source relay UE, the two or more remote UEs may transmit information on a target relay UE to the source relay UE after performing the relay reselection process. Subsequently, the source relay UE selects an overlapping relay UE in the target relay UE information transmitted by the two or more remote UEs and monitors the overlapping relay UE with a priority, or the source relay UE selects a relay UE from the target relay UE information transmitted by the two or more remote UEs randomly and monitors the relay UE with a priority.

According to the embodiment of the present disclosure, in performing relay selection, the source relay UE may monitor a target relay UE reselected by the remote UE with a priority, thereby greatly simplifying the relay selection process of the source relay UE, saving time and signaling overheads, and improving the system performance.

In the other aspect, if each source relay UE and the remote UE both access to a same target relay UE, a load of the target relay UE is great, thereby influencing a serving quality of the source relay UE and a serving quality of the remote UE. In order to solve the technical problem, according to the embodiment of the present disclosure, a load factor may be maintained at a target relay UE side to indicate the number of the remote UEs currently accessed to the target relay UE.

According to the embodiment of the present disclosure, before determining that the quality of the link between the target relay UE and the electronic device 200 is greater than a predetermined threshold, the processing circuit 210 is further configured to perform an operation of: determining that the load factor of the target relay UE indicated by the target relay message is less than the predetermined number.

Here, in a case that the load factor of the target relay UE is less than the predetermined number, the source relay UE is allowed to access to the target relay UE. In a case that the load factor of the target relay UE is greater than the predetermined number, the source relay UE is refused to access to the target relay UE.

Figure 8:
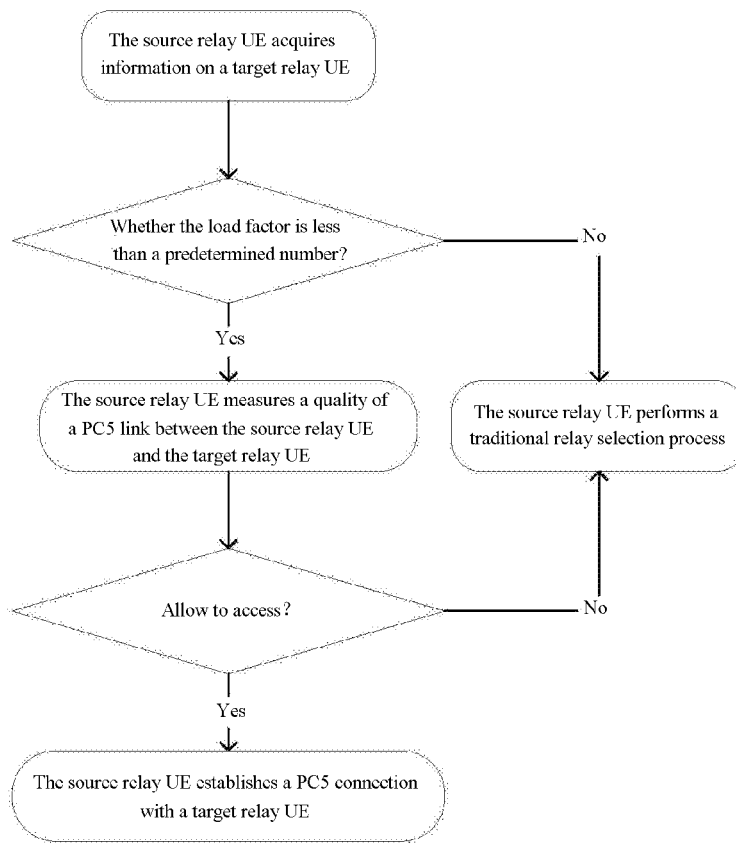
FIG. 8 is a schematic diagram showing a process of determining relay reselection of a remote user equipment based on load conditions of a target relay user equipment according to an embodiment of the present disclosure.

FIG. 8 is a schematic diagram showing a process in which relay reselection of a remote user equipment is determined based on a load condition of a target relay user equipment according to an embodiment of the present disclosure. As shown in FIG. 8, the source relay UE may acquire information on the target relay UE, including the load factor of the target relay UE. Subsequently, when determining that the load factor is less than the predetermined number, the source relay UE measures a quality of a PC5 link between the source relay UE and the target relay UE. In a case that the quality of the PC5 link between the source relay UE and the target relay UE meets an access condition, the source relay UE establishes a connection with the target relay UE. In a case that the source relay UE determines that the load factor is greater than a predetermined number, the source relay UE does not access to the target relay UE and performs the traditional relay selection process.

According to the embodiment of the present disclosure, the number of remote UEs connected to the target relay UE can be controlled effectively by the load factor, thereby avoiding influencing a serving quality due to a too heavy load of the target relay UE.

According to another embodiment of the present disclosure, the source relay UE may express a scenario where the source relay UE is located by a bias value. In the embodiment, the source relay UE may monitor a TTT length or received signal quality information of a neighbor cell periodically or in response to an event, and sets a bias value for a candidate target cell using the method described above for example. Further, the source relay UE may update the candidate target cell and a corresponding bias value, that is, replacing a candidate target cell generated last time and a corresponding bias value with a candidate target cell generated newly and a corresponding bias value. When the source relay UE is to be perform a handover process, the source relay UE transmits a newest candidate target cell generated and a corresponding bias value to the remote UE. That is, when the source relay UE determines to perform the handover process, the source relay UE may not transmit scenario information to the remote UE and directly transmits the candidate target cell and a corresponding bias value. When the source relay UE determines to perform a relay selection process, the source relay UE may not transmit scenario information to the remote UE and directly transmits a "null" bias value. At the remote UE side, in a case that the remote UE receives the bias value of the candidate target cell from the source relay UE, it can be determined that the source relay UE is to perform the handover process. In a case that the remote UE receives the "null" bias value from the source relay UE, it can be determined that the source relay UE is to perform the relay selection process.

According to the embodiment of the present disclosure, the scenario where the source relay UE is located can be determined based on the bias value, thereby saving a signaling overhead.

Figure 9:
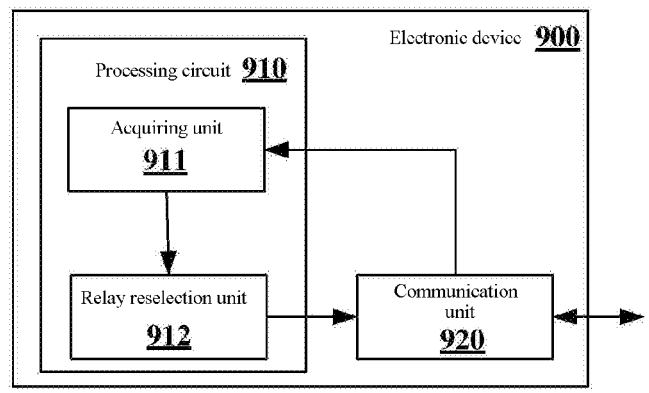
FIG. 9 is a block diagram showing a structure of another electronic device in a wireless communication system according to an embodiment of the present disclosure.

FIG. 9 is a block diagram showing a structure of an electronic device in a wireless communication system according to another embodiment of the present disclosure.

As shown in FIG. 9, an electronic device 900 may include a processing circuit 910. It should be noted that, the electronic device 900 may include one processing circuit 910 or multiple processing circuits 910. In addition, the electronic device 900 may further include a communication unit 920 such as a transceiver.

As described above, similarly, the processing circuit 910 may include various discrete functional units to perform different functions and/or operations. The functional units may be physical entities or logical entities, and units with different names may be implemented by a same physical entity.

For example, as shown in FIG. 9, the processing circuit 910 may include a monitoring unit 911, an acquiring unit 912 and a relay reselection unit 913.

The monitoring unit 911 may monitor a quality of a link between the electronic device 900 and a relay user equipment providing a relay service for the electronic device 900 in the wireless communication system.

The acquiring unit 912 acquires scenario information on a scenario where the relay user equipment is located.

Based on the scenario information, the relay reselection unit 913 performs a relay reselection process.

According to the embodiment of the present disclosure, the wireless communication system is an LTE-A cellular communication system, and the electronic device 900 is a remote UE in the wireless communication system.

Preferably, the scenario information is determined based on scenario identification information. The scenario identification information includes: first link information indicating a quality of a link between the electronic device 900 and the relay user equipment, second link information indicating a quality of a link between the relay user equipment and a base station in a serving cell providing a service for the electronic device 900 in the wireless communication system, and received serving cell power change rate information and received neighbor cell power change rate information received by the relay user equipment.

Preferably, in a case that the scenario information indicates that the relay UE is in a first scenario in which a handover process is to be performed, the processing circuit 910 is further configured to perform an operation of: acquiring cell IDs of candidate target cells and set a bias value for each of the candidate target cells; and determining a target relay UE from the candidate target cells based on the bias value.

Preferably, the processing circuit 910 is further configured to perform an operation of: ranking the candidate target cells in a descending order based on sizes of the bias values; and performing the relay reselection process on candidate target relay UEs in the candidate target cells in an order until the target relay UE is determined.

Preferably, in performing the relay reselection process, the processing circuit 910 is further configured to perform an operation of: acquiring a link quality value indicating a quality of a link between the electronic device 900 and a candidate target relay UE in the candidate target cell; adding a bias value corresponding to the candidate target cell to the link quality value of the candidate target relay UE in the candidate target cell, to obtain an adjusted link quality value; and performing the relay reselection process based on the adjusted link quality value.

Preferably, the processing circuit 910 is further configured to perform operations of: acquiring a speed adjustment factor of the relay UE; and adjusting a hysteresis parameter based on the speed adjustment factor.

Preferably, the electronic device 900 further includes a timer configured to start timing when the electronic device 900 establishes a connection with the target relay UE. The processing circuit 910 is further configured to perform an operation of: when the timer expires, generating a command to disconnect the electronic device 900 from the target relay UE or disconnect the electronic device 900 from the relay UE.

Preferably, when the communication unit 920 receives handover indication information indicating a success of handover process from the relay UE, the processing circuit 910 is further configured to perform operations of: acquiring a cell ID of a target cell of the relay UE; comparing the cell ID of the target cell of the relay UE with a cell ID of a serving cell of the target relay UE; immediately disconnecting the electronic device 900 from the relay UE in a case that the two cell IDs are different; in a case that the two cell IDs are same, acquiring updated first link information before the timer expires, and disconnecting the electronic device 900 from the target relay UE when the timer expires, in a case that the updated first link information indicates that an updated quality of link between the electronic device 900 and the relay UE is always greater than a predetermined threshold.

Preferably, when the communication unit 920 receives handover indication information indicating a failure of handover process from the relay UE, the processing circuit 910 is further configured to perform an operation of: instructing the communication unit 920 to transmit a cell ID of the serving cell of the target relay UE to the relay UE, such that the relay UE performs a radio link recovery process to be connected to the serving cell of the target relay UE.

Preferably, in a case that the scenario information indicates that the relay UE is in a second scenario in which a relay selection process is to be performed, the processing circuit 910 is further configured to perform an operation of: instructing the communication unit 920 to transmit target relay information of the target relay UE obtained after the relay reselection process is performed to the relay UE, to assist the relay UE to perform a relay selection process.

In summary, according to the embodiment of the present disclosure, the source relay UE may transmit scenario information on a scenario where the source relay UE is located to the remote UE. In the first scenario in which the source relay UE is to perform handover, the source relay UE can configure different bias values for the neighbor cell and transmit the bias values to the remote UE, such that the remote UE can select a relay UE in a cell to which the source relay UE is to switch as the target relay UE, thereby reducing the overhead of the X2 interface and simplifying the handover process. Further, the remote UE can adjust the hysteresis parameter of the remote UE based on the speed adjustment factor of the source relay UE and/or the change rate of the quality of the link between the remote UE and the source relay UE, such that the hysteresis parameter can be adjusted more accurately. Further, when completing the handover, the source relay UE may transmit handover indication information to the remote UE, such that the remote UE can select an appropriate relay UE to access from the source relay UE and the target relay UE in a case of handover success, and quick RRC reestablishment of the source relay UE can be implemented in a case of handover failure, thereby reducing interruption time. In addition, in the second scenario in which the source relay UE is to perform the relay selection process, the remote UE assists the source relay UE to perform quick relay selection, thereby simplifying the relay selection process and reducing the system signaling overhead.

Figure 10:
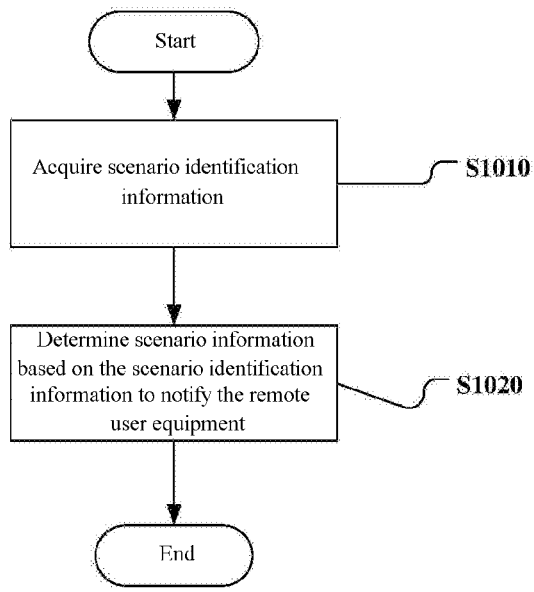
FIG. 10 is a flowchart of a wireless communication method according to an embodiment of the present disclosure.

Subsequently, a method for performing wireless communication in a wireless communication system according to an embodiment of the present disclosure is described with reference to FIG. 10. FIG. 10 shows a flowchart of a wireless communication method according to an embodiment of the present disclosure.

As shown in FIG. 10, firstly, in step S1010, scenario identification information is acquired. The scenario identification information includes first link information indicating a quality of a link between a relay user equipment in the wireless communication system and a remote user equipment in the wireless communication system, second link information indicating a quality of a link between the relay user equipment and a base station in a serving cell providing a service for the relay user equipment in the wireless communication system, and received serving cell power change rate information and received neighbor cell power change rate information.

Then, in step S1020, based on the scenario identification information, scenario information on a scenario where the relay user equipment is located is determined to notify a remote user equipment, so as to assist the remote user equipment to perform a relay reselection process or assist the relay user equipment to perform a relay selection process.

Preferably, in a case that the second link information indicates the quality of the link between the relay user equipment and the base station is less than a second threshold, relay reselection trigger information is generated to instruct the remote user equipment to perform the relay reselection process.

Preferably, in a case that the first link information indicates the quality of the link between the relay user equipment and the remote user equipment is greater than a first threshold, the second link information indicates the quality of the link between the relay user equipment and the base station is less than the second threshold, and a difference between a change rate of a received power of a neighbor cell indicated by the received neighbor cell power change rate information and a change rate of a received power of a serving cell indicated by the received serving cell power change rate is greater than a third threshold, it is determined that the relay user equipment is to perform the handover process.

Preferably, the method further includes: acquiring Time To Trigger TTT length information indicating a length of TTT of a running event A3 or received neighbor cell signal quality information; determining candidate target cells for the remote user equipment based on the TTT length information or the received neighbor cell signal quality information; and setting a bias value for each of the candidate target cells, so as to assist the remote user equipment to select a final target cell providing a service for the remote user equipment after the relay reselection process is performed.

Preferably, the bias value for the candidate target cell is set based on the TTT length information or the received neighbor cell signal quality information.

Preferably, the method further includes: in a case that the second link information indicates the quality of the link between the relay user equipment and the base station is less than the second threshold, acquiring a speed adjustment factor of the relay user equipment, to instruct the remote user equipment to adjust the hysteresis parameter of the remote user equipment.

Preferably, the method further includes: performing a handover process; and generating handover indication information indicating a result of performing the handover process, to instruct the remote user equipment to select a final relay link connection.

Preferably, the method further includes: in a case that the handover indication information indicates a failure of handover process, acquiring a cell ID of a final target cell providing a service for the remote user equipment after the relay reselection process is performed; determining that the final target cell already causes Time To Trigger TTT of a running event A3, to notify the base station of handover process failure and the cell ID of the final target cell; and performing a radio link recovery process when the Time To Trigger TTT of the running event A3 caused by the final target cell expires, such that the relay user equipment is connected to the final target cell.

Preferably, in a case that the first link information indicates that the quality of the link between the relay user equipment and the remote user equipment is greater than the first threshold, the second link information indicates the quality of the link between the relay user equipment and the base station is less than the second threshold, and the difference between a change rate of a received power of a neighbor cell indicated by the received neighbor cell power change rate information and a change rate of a received power of a serving cell indicated by the received serving cell power change rate information is less than the third threshold, it is determined that the relay user equipment is to perform the relay selection process.

Preferably, the method further includes: acquiring target relay information on a target relay user equipment obtained after the remote user equipment performs the relay reselection process; and performing a relay selection process. The process of performing the relay selection process includes: monitoring a discovery message of the target relay user equipment indicated by the target relay information with a priority; determining that the quality of the link between the target relay user equipment and the relay user equipment is greater than a predetermined threshold; and establishing a relay connection between the target relay user equipment and the relay user equipment.

Preferably, before the process of determining that the quality of the link between the target relay user equipment and the relay user equipment is greater than a predetermined threshold, the method further includes: determining that a load factor of the target relay user equipment indicated by the target relay information is less than a predetermined number. The load factor indicates the number of remote user equipments currently accessed to the target relay user equipment.

Preferably, the wireless communication system is an advanced long term evolution (LTE-A) cellular communication system.

Figure 11:
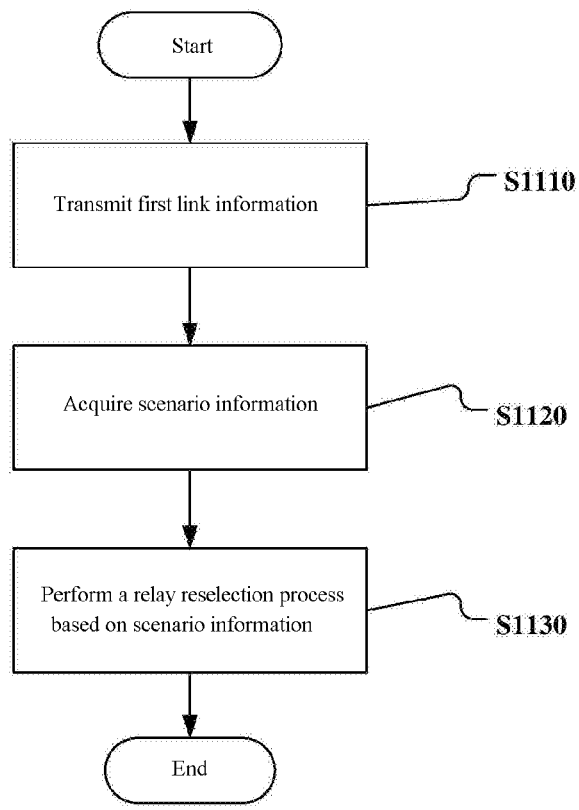
FIG. 11 is a flowchart of a wireless communication method according to another embodiment of the present disclosure.

Subsequently, a method for performing wireless communication in a wireless communication system according to another embodiment of the present disclosure is described with reference to FIG. 11. FIG. 11 shows a flowchart of a wireless communication method according to another embodiment of the present disclosure.

As shown in FIG. 11, firstly, in step S1110, a quality of a link between a remote user equipment and a relay user equipment providing a relay service for the remote user equipment in the wireless communication system is monitored.

Subsequently, in step S1120, scenario information on a scenario where the relay user equipment is located is acquired.

Subsequently, in step S1130, a relay reselection process is performed based on the scenario information.

Preferably, scenario information is determined based on scenario identification information. The scenario identification information includes: first link information indicating a quality of a link between the remote user equipment and the relay user equipment, second link information indicating a quality of a link between the relay user equipment and a base station in a serving cell providing a service for the remote user equipment in the wireless communication system, and serving cell power change rate information and neighbor cell power change rate information received by the relay user equipment.

Preferably, the method further includes: in a case that the scenario information indicates that the relay user equipment is in a first scenario in which a handover process is to be performed, acquiring cell IDs of the candidate target cells and setting a bias value for each of the candidate target cells by the remote user equipment; and determining a target relay user equipment from the candidate target cells based on the bias value.

Preferably, the method further includes: ranking candidate target cells in a descending order based on sizes of the bias values; and performing a relay reselection process on a candidate target relay user equipment in the candidate target cell in an order, until the target relay user equipment is determined.

Preferably, the process of performing the relay reselection process includes: acquiring a link quality value indicating a quality of a link between the remote user equipment and the candidate target relay user equipment in the candidate target cell; adding a bias value corresponding to the candidate target cell to the link quality value of the candidate target relay user equipment in the candidate target cell, to obtain an adjusted link quality value; and performing the relay reselection process based on the adjusted link quality value.

Preferably, the method further includes: acquiring a speed adjustment factor of the relay user equipment; and adjusting a hysteresis parameter of the remote user equipment based on the speed adjustment factor.

Preferably, the remote user equipment includes a timer configured to start timing when the remote user equipment and the target user equipment establish a connection. The method further includes: when the timer expires, generating a command to disconnect the remote user equipment from the target relay user equipment or disconnect the remote user equipment from the relay user equipment.

Preferably, the method further includes: in a case that the relay ruse equipment receives handover indication information indicating a success of handover process, acquiring a cell ID of a target cell of the relay user equipment; comparing the cell ID of the target cell of the relay user equipment with a cell ID of a serving cell of the target relay user equipment; immediately disconnecting the remote user equipment from the relay user equipment in a case that the two cell IDs are different; in a case that the two cell IDs are the same, acquiring updated first link information before the timer expires, and disconnecting the remote user equipment from the target relay user equipment when the timer expires in a case that the updated first link information indicates that a quality of the updated link between the remote user equipment and the relay user equipment is always greater than a predetermined threshold.

Preferably, the method further includes: in a case that the handover indication information indicating a failure of a handover process is received from the relay user equipment, transmitting a cell ID of a serving cell of the target relay user equipment to the relay user equipment, such that the relay user equipment performs a radio link recovery process to be connected to the serving cell of the target relay user equipment.

Preferably, the method further includes: in a case that the scenario information indicates that the relay user equipment is in a second scenario in which a relay selection process is to be performed, transmitting target relay information on the target relay user equipment obtained after the relay reselection process is performed to the relay user equipment, to assist the relay user equipment to perform a relay selection process.

Preferably, the wireless communication system is an advanced long term evolution (LTE-A) cellular communication system, and the method is performed by the remote user equipment.

Subsequently, a method for performing wireless communication in a wireless communication system according to another embodiment of the present disclosure is described. Firstly, a quality of a link between a remote user equipment and a relay user equipment providing a service for the remote user equipment in the wireless communication system is monitored.

Subsequently, a quality of a link between the relay user equipment and a base station in serving cell providing a service for the relay user equipment and the remote user equipment in the wireless communication system is monitored.

Subsequently, a change rate of a received power of a neighbor cell and a change rate of a received power of a serving cell are monitored.

Subsequently, in a case that the quality of the link between the remote user equipment and the relay user equipment is greater than a first threshold, the quality of the link between the relay user equipment and the base station is less than a second threshold and a difference between the change rate of the received power of the neighbor cell and the change rate of the received power of the serving cell is greater than a third threshold, received neighbor cell signal quality information is acquired; candidate target cells on which relay reselection is to be performed for the remote user equipment is determined, based on the received neighbor cell signal quality information; a bias value for each of the candidate target cells is set; and a relay reselection process of the remote user equipment based on the bias value is performed.

Various implementations of steps in the method for performing wireless communication in the wireless communication system according to the embodiment of the present disclosure are described in detail above, which re not repeated here.

The technology according to the present disclosure may be applied to various types of products. For example, the base station mentioned in the present disclosure may be implemented as any type of evolution Node B (eNB), such as a macro eNB and a small eNB. The small eNB may be an eNB of a cell with a coverage less than that of a macro cell, such as a pico-eNB, a micro-eNB and a household (femto) eNB. Alternatively, the base station may be implemented as any other types of base stations, such as a NodeB and a base transceiver station (BTS). The base station may include: a body configured to control wireless communication (also referred to as a base station device); and one or more remote radio head-ends (RRHs) arranged at different places from the body. In addition, various types of terminals described in the following may function as a base station to operate by performing functions of the base station temporarily or in a semi-persistent manner.

For example, the UE mentioned in the present disclosure may be implemented as a mobile terminal (such as a smart phone, a tablet personal computer (PC), a notebook PC, a portable game terminal and a portable/dongle mobile router and a digital camera) or a vehicle-mounted terminal (such as an automobile navigation device). The UE may be further implemented as a terminal performing machine to machine (M2M) communication (also referred to as a MTC terminal). In addition, the UE may be a wireless communication module installed on each of the above terminals (such as an integrated circuit module including a single wafer).

Figure 12:
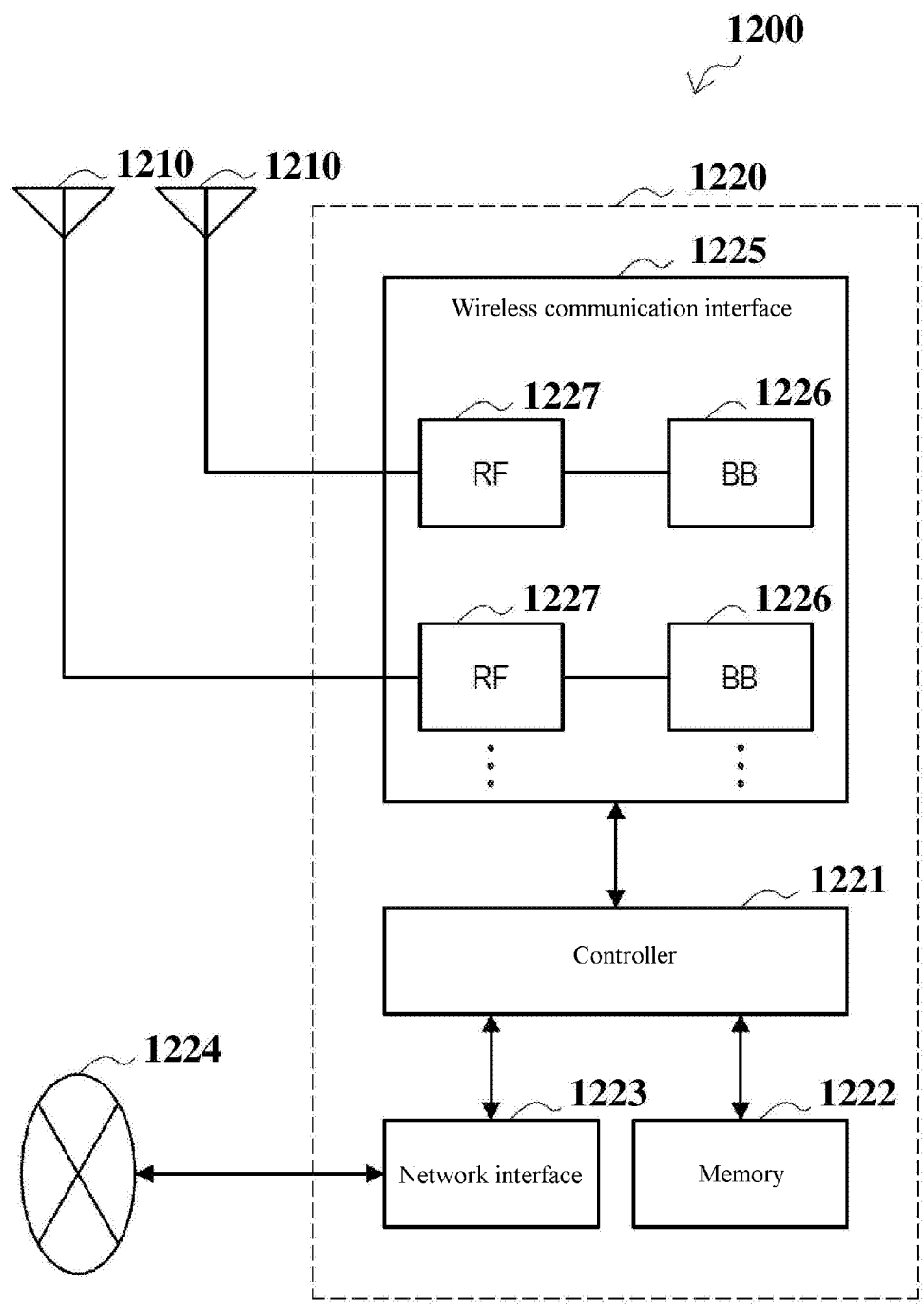
FIG. 12 is a block diagram showing a first example of a schematic configuration of an evolution Node Base Station (eNB) adapting to the present disclosure.

FIG. 12 is a block diagram showing a first example of a schematic configuration of an eNB to which the technology of the present disclosure may be applied. An eNB 1200 includes one or more antennas 1210 and a base station device 1220. The base station device 1220 and each antenna 1210 may be connected to each other via an RF cable.

Each of the antennas 1210 includes a single or multiple antenna elements (such as multiple antenna elements included in a multiple-input multiple-output (MIMO) antenna) and is used for the base station device 1220 to transmit and receive a wireless signal. As shown in FIG. 12, the eNB 1200 may include multiple antennas 1210. For example, the multiple antennas 1210 may be compatible with multiple frequency bands used by the eNB 1200. Although FIG. 12 shows an example in which the eNB 1200 includes multiple antennas 1210, the eNB 1200 may include a single antenna 1210.

The base station device 1220 includes a controller 1221, a memory 1222, a network interface 1223 and a wireless communication interface 1225.

The controller 1221 may be a CPU or DSP for example and controls various types of functions of higher layers of the base station device 1220. For example, the controller 1221 generates a data packet according to data in a signal processed by the wireless communication interface 1225, and transfers the generated packet via the network interface 1223. The controller 1221 may bundle data from multiple baseband processors to generate a bundle packet and transfers the generated bundle packet. The controller 1221 may have logic functions to perform the following control: such as wireless resource control, wireless bearer control, mobility management, admission control and schedule. The control may be implemented in conjunction with an eNB or a core network node nearby. The memory 1222 includes an RAM and an ROM and stores programs performed by the controller 1221 and various types of control data (such as a terminal list, transmission power data and schedule data).

The network interface 1223 is a communication interface connecting a base station device 1220 to a core network 1224. The controller 1221 may communicate with a core network node or another eNB via the network interface 1223. In this case, the eNB 1200 may be connected to the core network node or other eNB via a logic interface (such as an S1 interface and an X2 interface). The network interface 1223 may also be a wired communication interface or a wireless communication interface for a wireless backhaul line. If the network interface 1223 is a wireless communication interface, the network interface 1223 may use a higher frequency band for wireless communication as compared with a frequency band used by the wireless communication interface 1225.

The wireless communication interface 1225 supports any cellular communication scheme (such as Long Term Evolution (LTE) and LTE-advanced), and provide wireless connection to a terminal in a cell of the eNB 1200 via an antenna 1210. The wireless communication interface 1225 may generally include a baseband (BB) processor 1226 and an RF circuit 1227. The BB processor 1226 may perform for example encoding/decoding, modulating/demodulating and multiplexing and de-multiplexing and perform various types of signal processing of layers (such as L1, medium access control (MAC), radio link control (RLC) and packet data convergence protocol (PDCP). Instead of a controller 1221, the BB processor 1226 may have a part or all of the logic functions described above. The BB processor 1226 may be a memory storing communication control programs, or a module including a processor configured to perform programs and related circuits. Updating programs may change functions of the BB processor 1226. The module may be a card or a blade inserted to a slot of the base station device 1220. Alternatively, the module may also be a chip installed on the card or the blade. Meanwhile, an RF circuit 1227 may include for example a mixer, a filter and an amplifier, and transmits and receives a wireless signal via the antenna 1210.

As shown in FIG. 12, the wireless communication interface 1225 may include multiple BB processors 1226. For example, the multiple BB processors 1226 may be compatible with multiple frequency bands used by the eNB 1200. As shown in FIG. 12, the wireless communication interface 1225 may include multiple RF circuits 1227. For example, the multiple RF circuits 1227 may be compatible with multiple antenna elements. Although FIG. 12 shows an example in which the wireless communication interface 1225 includes multiple BB processors 1226 and multiple RF circuits 2127, the wireless communication interface 1225 may include a single BB processor 1226 or a single RF circuit 1227.

Figure 13:
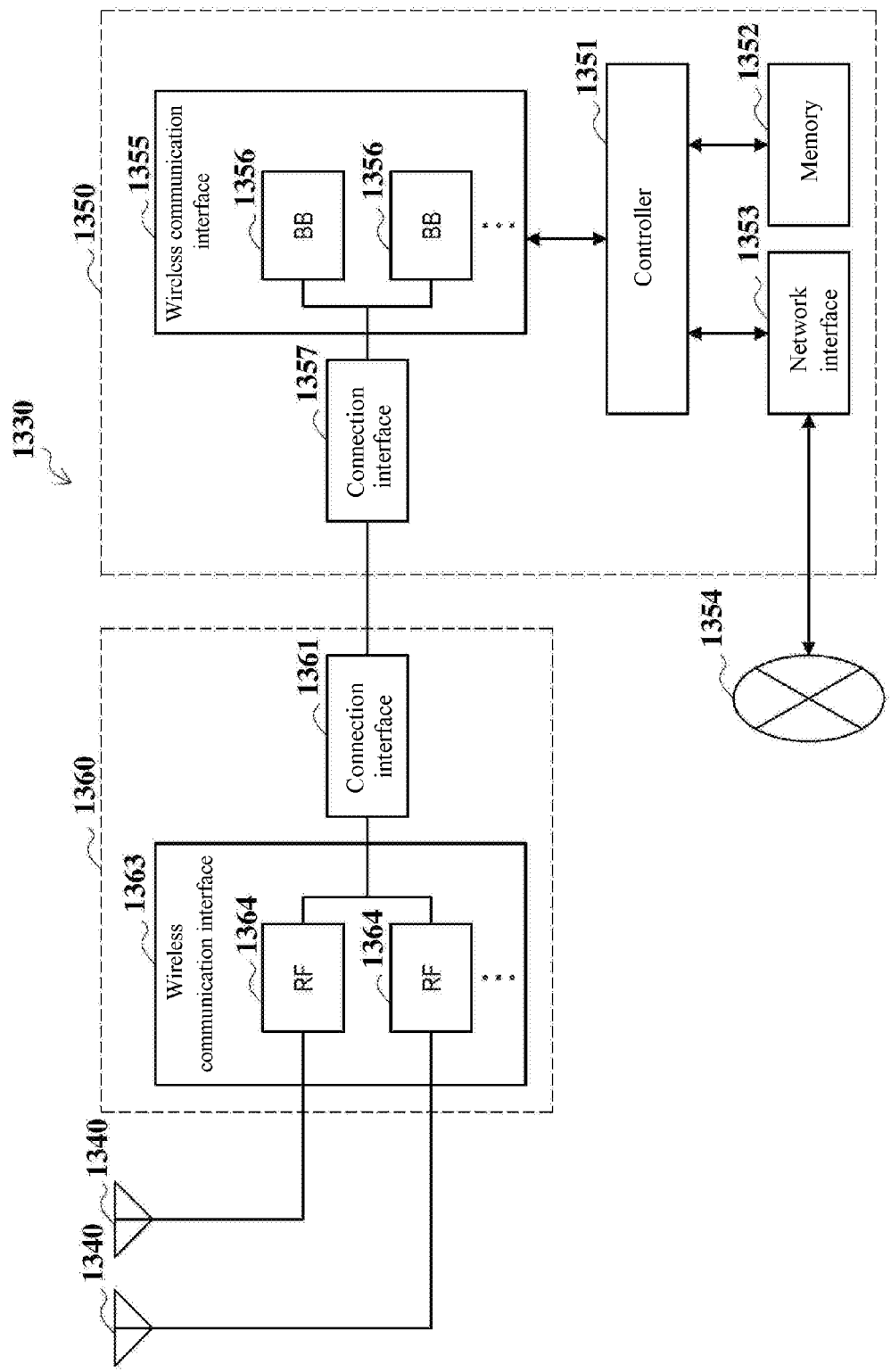
FIG. 13 is a block diagram showing a second example of the schematic configuration of the eNB adapting to the present disclosure.

FIG. 13 is a block diagram showing a second example of the schematic configuration of the eNB to which the technology of the present disclosure may be applied. An eNB 1330 includes one or more antennas 1340, a base station device 1350 and an RRH 1360. The RRH 1360 and each antenna 1340 may be connected to each other via an RF cable. The base station device 1350 and the RRH 1360 may be connected to each other via a high speed line such as an optical fiber cable.

Each of the antennas 1340 includes a single or multiple antenna elements (such as multiple antenna elements included in the MIMO antenna) and is used for the RRH 1360 to transmit and receive a wireless signal. As shown in FIG. 13, the eNB 1330 may include multiple antennas 1340. For example, the multiple antennas 1340 may be compatible with multiple frequency bands used by the eNB 1330. Although FIG. 11 shows an example in which the eNB 1330 includes multiple antennas 1340, the eNB 1330 may include a single antenna 1340.

The base station device 1350 includes a controller 1351, a memory 1352, a network interface 1353, a wireless communication interface 1355 and a connection interface 1357. The controller 1351, the memory 1352 and the network interface 1353 are the same as the controller 1221, the memory 1222 and the network interface 1223 described with reference to FIG. 12.

A wireless communication interface 1355 supports any cellular communication scheme (such as LTE and LTE-advanced), and provide wireless communication with a terminal in a sector corresponding to the RRH 1360 via the RRH 1360 and the antenna 1340. The wireless communication interface 1355 may generally include a BB processor 1356 for example. In addition to that the BB processor 1356 is connected to an RF circuit 1364 of the RRH 1360 via the connection interface 1357, the BB processor 1356 is the same as the BB processor 1226 described with reference to FIG. 12. As shown in FIG. 13, the wireless communication interface 1355 may include multiple BB processors 1356. For example, the multiple BB processors 1356 may be compatible with multiple frequency bands used by the eNB 1330. Although FIG. 13 shows an example in which the wireless communication interface 1355 includes multiple BB processors 1356, the wireless communication interface 1355 may include a single BB processor 1356.

The connection interface 1357 is an interface configured to connect the base station device 1350 (the wireless communication interface 1355) to the RRH 1360. The connection interface 1357 may be a communication module for communication in the high speed line described above which connects the base station device 1350 (the wireless communication interface 1355) to the RRH 1360.

The RRH 1360 includes a connection interface 1361 and a wireless communication interface 1363.

The connection interface 1361 is an interface configured to connect the RRH 1360 (the wireless communication interface 1363) to the base station device 1350. The connection interface 1361 may be a communication module for performing communication via the high speed line described above.

The wireless communication interface 1363 transmits and receives a wireless signal via the antenna 1340. The wireless communication interface 1363 may generally include an RF circuit 1364 for example. The RF circuit 1364 may include for example a mixer, a filter and an amplifier, and transmits and receives a wireless signal via the antenna 1340. As shown in FIG. 13, the wireless communication interface 1363 may include multiple RF circuits 1364. For example, the multiple RF circuits 1364 may support multiple antenna elements. Although FIG. 13 shows an example in which the wireless communication interface 1363 includes multiple RF circuits 1364, the wireless communication interface 1363 may include a single RF circuit 1364.

The base station according to the embodiment of the present disclosure may be implemented by the eNB1200 shown in FIG. 12 or the eNB1330 shown in FIG. 13.

Figure 14:
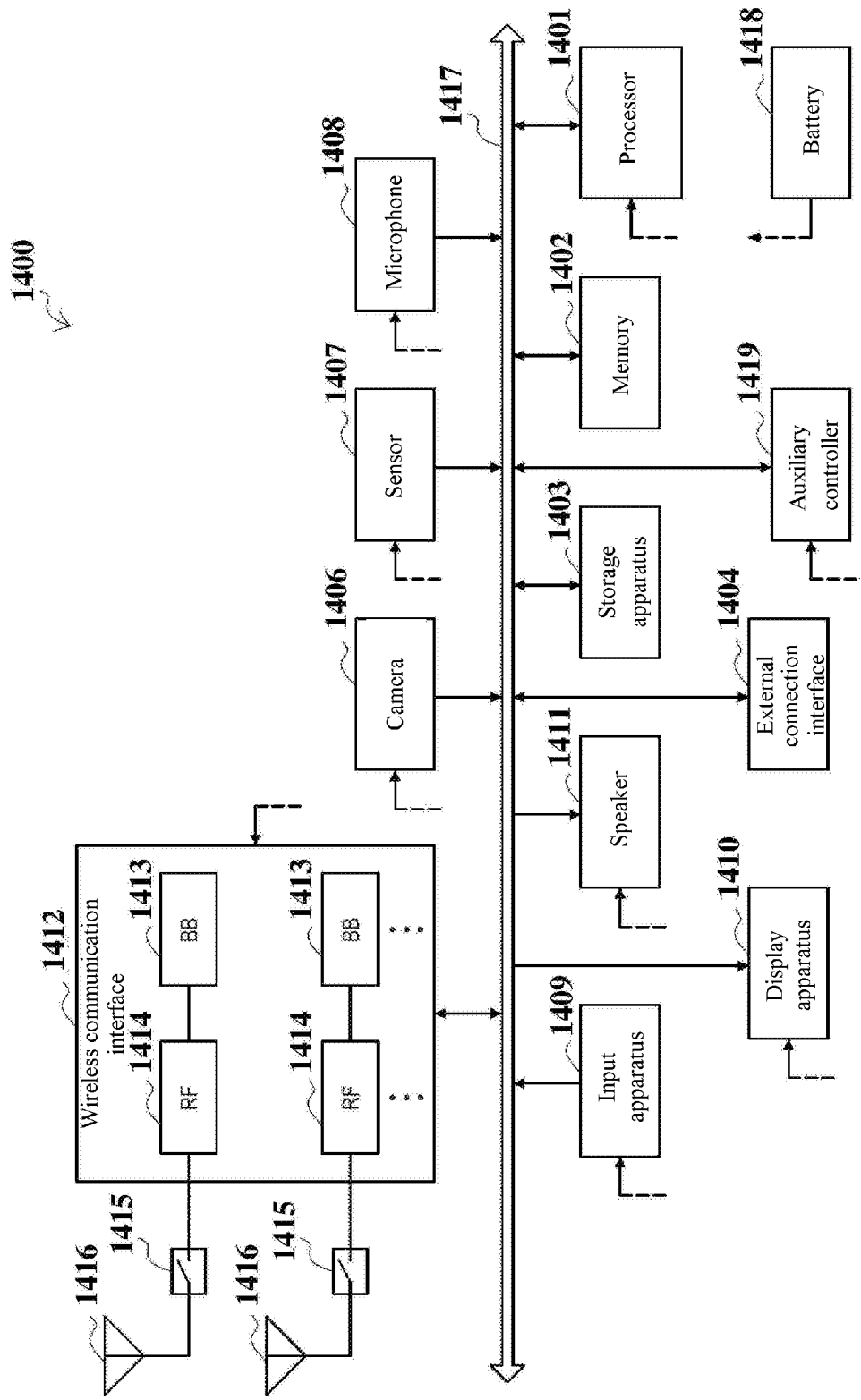
FIG. 14 is a block diagram of an example of a schematic configuration of a smartphone adapting to the present disclosure.

FIG. 14 is a block diagram showing an example of a schematic configuration of a smart phone 1400 to which the technology of the present disclosure may be applied. The smart phone 1400 includes: a processor 1401, a memory 1402, a storage apparatus 1403, an external connection interface 1404, a camera 1406, a sensor 1407, a microphone 1408, an input apparatus 1409, a display apparatus 1410, a loudspeaker 1411, a wireless communication interface 1412, one or more antenna switches 1415, one or more antennas 1416, a bus 1417, a battery 1418 and an auxiliary controller 1419.

The processor 1401 may be for example a CPU or a system on chip (SoC), and control functions of an application layer and other layers of the smart phone 1400. The memory 1402 includes an RAM and an ROM, and stores programs executed by the processor 1401 and data. The storage apparatus 1403 may include a storage medium, such as a semiconductor memory and a hard disk. The external connection interface 1404 is an interface configured to connect an external apparatus (such as a memory card and a universal serial bus (USB) device) to the smart phone 1400.

The camera 1406 includes an image sensor (such as a charge coupled device (CCD) and a complementary metal oxide semiconductor (CMOS)) and generates a captured image. The sensor 1407 may include a set of sensors, such as a measurement sensor, a gyroscope sensor, a geomagnetic sensor and an acceleration sensor. The microphone 1408 converts sound inputted into the smart phone 1400 into an audio signal. The input apparatus 1409 includes for example a touch sensor configured to detect touch on a screen of the display apparatus 1410, a keypad, a keyboard, a button or a switch, and receives an operation or information inputted from a user. The display apparatus 1410 includes a screen (such as a liquid crystal display (LCD) and an organic light emitting diode (OLED) display), and displays an output image of the smart phone 1400. The loudspeaker 1411 converts the audio signal outputted from the smart phone 1400 into sound.

The wireless communication interface 1412 supports any cellular communication scheme (such as LTE and LTE-advanced), and performs wireless communication. The wireless communication interface 1412 may generally include for example a BB processor 1413 and an RF circuit 1414. The BB processor 1413 may perform encoding/decoding, modulating/demodulating and multiplexing/de-multiplexing for example, and perform various types of signal processing for wireless communication. Meanwhile, the RF circuit 1414 may include for example a mixer, a filter and an amplifier, and transmits and receives a wireless signal via an antenna 1416. The wireless communication interface 1412 may be a chip module on which a BB processor 1413 and the RF circuit 1414 are integrated. As shown in FIG. 14, the wireless communication interface 1412 may include multiple BB processors 1413 and multiple RF circuits 1414. Although FIG. 14 shows an example in which the wireless communication interface 1412 includes multiple BB processors 1413 and multiple RF circuits 1414, the wireless communication interface 1412 may include a single BB processor 1413 or a single RF circuit 1414.

In addition to the cellular communication scheme, the wireless communication interface 1412 may support other types of wireless communication schemes, such as a short distance wireless communication scheme, a near field communication scheme and a wireless local area network (LAN) scheme. In this case, the wireless communication interface 1412 may include a BB processor 1413 and an RF circuit 1414 for each type of wireless communication scheme.

Each of the wireless switches 1415 switches a connection destination of the antenna 1416 between multiple circuits (for example circuits for different wireless communication schemes) included in the wireless communication interface 1412.

Each of the antennas 1416 includes a single or multiple antenna elements (such as multiple antenna elements included in the MIMO antenna), and is used for the wireless communication interface 1412 to transmit and receive a wireless signal. As shown in FIG. 14, the smart phone 1400 may include multiple antennas 1416. Although FIG. 14 shows an example in which the smart phone 1400 includes multiple antennas 1416, the smart phone 1400 may include a single antenna 1416.

In addition, the smart phone 1400 may include an antenna 1416 for each type of wireless communication scheme. In this case, the antenna switch 1415 may be omitted from the configuration of the smart phone 1400.

The bus 1417 connects the processor 1401, the memory 1402, the storage apparatus 1403, the external connection interface 1404, the camera 1406, the sensor 1407, the microphone 1408, the input apparatus 1409, the display apparatus 1410, the loudspeaker 1411, the wireless communication interface 1412 and the auxiliary controller 1419 with each other. The battery 1418 supplies power for blocks in the smart phone 1400 shown in FIG. 14 via a feeder which is indicated partially as a dashed line in the figure. The auxiliary controller 1419 controls a minimum necessary function of the smart phone 1400 in a sleeping mode, for example.

In the smart phone 1400 shown in FIG. 14, the processing circuit 210 described with reference to FIG. 2 and the acquiring unit 211 and the determining unit 212 in the processing circuit 210, and the processing circuit 910 described with reference to FIG. 9 and the monitoring unit 911, the acquiring unit 912 and the relay reselection unit 913 in the processing circuit 910 may be implemented by the processor 1401 or the auxiliary controller 1419. The communication unit 220 described with reference to FIG. 2 and the communication unit 920 described with reference to FIG. 9 may be implemented by the wireless communication interface 1412. At least a part of the functions may be implemented by the processor 1401 or the auxiliary controller 1419. For example, the processor 1401 or the auxiliary controller 1419 may acquire the scenario identification information, determine the scenario information and acquire the scenario information and perform the relay reselection by executing instructions stored in the memory 1402 or the storage apparatus 1403.

Figure 15:
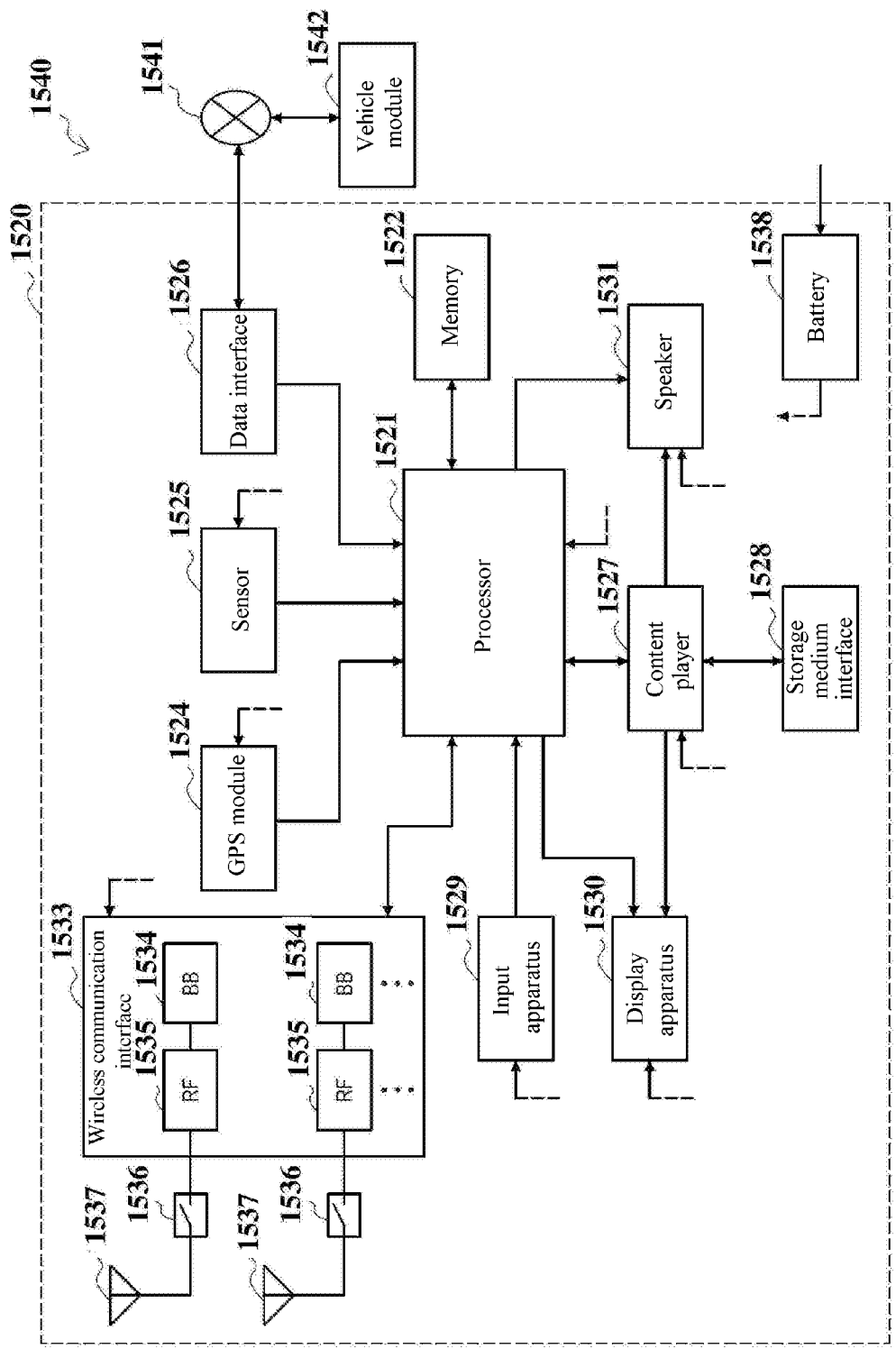
FIG. 15 is a block diagram showing an example of a schematic configuration of an automobile navigation device adapting to the present disclosure.

FIG. 15 is a block diagram showing an example of a schematic configuration of an automobile navigation device 1520 to which the technology of the present disclosure may be applied. The automobile navigation device 1520 includes a processor 1521, a memory 1522, a global positioning system (GPS) module 1524, a sensor 1525, a data interface 1526, a content player 1527, a storage medium interface 1528, an input apparatus 1529, a display apparatus 1530, a loudspeaker 1531, a wireless communication interface 1533, one or more antenna switches 1536, one or more antennas 1537 and a battery 1538.

The processor 1521 may be a CPU or an SoC, and controls a navigation function and other functions of the automobile navigation device 1520. The memory 1522 includes an RAM and an ROM, and stores programs executed by the processor 1521 and data.

The GPS module 1524 measures a position of the automobile navigation device 1520 (such as a latitude, a longitude and a height) by using a GPS signal received from a GPS satellite. The sensor 1525 may include a set of sensors, such as a gyroscope sensor, a geomagnetic sensor and an air pressure sensor. The data interface 1526 is connected to a vehicle network 1541 for example through a terminal not shown, and acquires data generated by the vehicle (such as vehicle speed data).

The content player 1527 reproduces contents stored in a storage medium (such as a CD and a DVD), and the storage medium is inserted into the storage medium interface 1528. The input apparatus 1529 includes for example a touch sensor configured to detect touch on a screen of the display apparatus 1530, a button or a switch, and receives an operation or information inputted from a user. The display apparatus 1530 includes a screen of an LCD or OLED display for example, and displays an image with a navigation function or the reproduced content. The loudspeaker 1531 outputs a sound with a navigation function or the reproduced content.

The wireless communication interface 1533 supports any cellular communication scheme (such as LTE and LTE-advanced), and performs wireless communication. The wireless communication interface 1533 may generally include a BB processor 1534 and an RF circuit 1535 for example. The BB processor 1534 may perform encoding/decoding, modulating/demodulating and multiplexing/de-multiplexing, and perform various types of signal processing for wireless communication. Meanwhile, the RF circuit 1535 may include for example a mixer, a filter and an amplifier, and transmits and receives a wireless signal via the antenna 1537. The wireless communication interface 1533 may also be a chip module on which the BB processor 1534 and the RF circuit 1535 are integrated. As shown in FIG. 15, the wireless communication interface 1533 may include multiple BB processors 1534 and multiple RF circuits 1535. Although FIG. 15 shows an example in which the wireless communication interface 1533 includes multiple BB processors 1534 and multiple RF circuits 1535, the wireless communication interface 1533 may include a single BB processor 1534 or a single RF circuit 1535.

In addition to the cellular communication scheme, the wireless communication interface 1533 may support other types of wireless communication schemes, such as a short distance wireless communication scheme, a near field communication scheme and a wireless LAN scheme. In this case, for each type of wireless communication scheme, the wireless communication interface 1533 may include the BB processor 1534 and the RF circuit 1535.

Each of the antenna switches 1536 switches a connection destination of the antenna 1537 between multiple circuits (such as circuits for different wireless communication schemes) included in the wireless communication interface 1533.

Each of the antennas 1537 includes a single or multiple antenna elements (such as multiple antenna elements included in the MIMO antenna), and is used for the wireless communication interface 1533 to transmit and receive a wireless signal. As shown in FIG. 15, the automobile navigation device 1520 may include multiple antennas 1537. Although FIG. 15 shows an example in which the automobile navigation device 1520 includes multiple antennas 1537, the automobile navigation device 1520 may include a single antenna 1537.

In addition, the automobile navigation device 1520 may include the antenna 1537 for each type of wireless communication scheme. In this case, the antenna switch 1536 may be omitted from the configuration of the automobile navigation device 1520.

The battery 1538 supplies power for blocks in the automobile navigation device 1520 shown in FIG. 15 via a feeder which is indicated partially as a dashed line in the figure. The battery 1538 accumulates power provided by the vehicle.

In the automobile navigation device 1520 shown in FIG. 15, the processing circuit 210 described with reference to FIG. 2 and the acquiring unit 211 and the determining unit 212 in the processing circuit 210, and the processing circuit 910 described with reference to FIG. 9 and the acquiring unit 911 and the relay reselection unit 912 in the processing circuit 910 may be implemented by the processor 1521. The communication unit 220 described with reference to FIG. 2 and the communication unit 920 described with reference to FIG. 9 may be implemented by the wireless communication interface 1533. At least a part of the functions may be implemented by the processor 1521. For example, the processor 1521 may acquire the scenario identification information, determine the scenario information and acquire the scenario information and perform the relay reselection by executing instructions stored in the memory 1522.

The technology of the present disclosure may be implemented as a vehicle-mounted system (or a vehicle) 1540 including one or more of the automobile navigation device 1520, the vehicle network 1541 and a vehicle module 1542. The vehicle module 1542 generates vehicle data (such as a vehicle speed, an engine speed and fault information), and outputs the generated data to the vehicle network 1541.

In the system and method according to the present disclosure, obviously, components or steps may be decomposed and/or recombined. The decomposition and/or recombination should be regarded as equivalent solutions of the present disclosure. In addition, steps in the series of processing described above may be performed naturally in an order of description and in a time order, and is not necessarily performed in the time order. Some steps may be performed in parallel or independently from each other.

Although the embodiments of the present disclosure are described in detail in conjunction with the drawings above, it should be understood that the embodiments described above are only used to illustrate the present disclosure and are not intended to limit the present disclosure. For those skilled in the art, various types of changes and modifications may be made to the embodiments without departing from the essence and scope of the present disclosure. Therefore, the scope of the present disclosure is defined by only the appended claims and equivalent meaning thereof.

The invention claimed is:

1. An electronic device in a wireless communication system, comprising:
one or more processing circuits configured to:
measure a first link quality between the electronic device and a relay user equipment in the wireless communication system for a relay service for the electronic device in the wireless communication system, and receive discovery signals;
based on the measured result and the discovery signals, perform a relay reselection process;
perform communication with a base station through the relay user equipment when a second link quality between the electronic device and the base station becomes poor; and
in a case when both the first link quality is greater than a first threshold and the second link quality is less than a second threshold, determine that the electronic device is to perform a handover process.

2. The electronic device according to claim 1, wherein the one or more processing circuits are further configured to:
measure received serving cell power change rate information and received neighbor cell power change rate information; and
based on the measured result, assist the electronic device to perform a relay selection process.

3. The electronic device according to claim 2, wherein the one or more processing circuits are further configured to determine that the electronic device is to perform a handover process when a difference between a change rate of the received power of a neighbor cell indicated by the received neighbor cell power change rate information and a change rate of the received power of the serving cell indicated by the received serving cell power change rate information is greater than a third threshold.

4. The electronic device according to claim 3, wherein the one or more processing circuits are further configured to:
acquire Time To Trigger TTT length information indicating a length of TTT of a running event A3 or received neighbor cell signal quality information;
determine candidate target cells for the user equipment based on the TTT length information or the received neighbor cell signal quality information; and
set a bias value for each of the candidate target cells to assist the user equipment to select, from the candidate target cells, a final target cell for providing a service for the user equipment.

5. The electronic device according to claim 3, wherein the one or more processing circuits are further configured to:
   perform the handover process; and
   generate handover indication information to instruct the user equipment to select a final relay link connection, the handover indication information indicating a result of performing the handover process.

6. The electronic device according to claim 5, wherein, in a case that the handover indication information indicates a failure to perform the handover process, the one or more processing circuits are further configured to:
   acquire a cell ID of the final target cell for providing a service for the user equipment after performing the relay reselection process;
   determine that the final target cell has caused the Time To Trigger TTT of the running event A3 to inform the base station of the failure to perform the handover process and the cell ID of the final target cell; and
   perform a radio link recovery process when the Time To Trigger TTT of the running event A3 caused by the final target cell expires, so that the electronic device is connected to the final target cell.

7. The electronic device according to claim 1, wherein the one or more processing circuits generate relay reselection trigger information to instruct the user equipment to perform the relay reselection process when the second link quality of the link between the electronic device and the base station is less than the second threshold.

8. The electronic device according to claim 1, wherein the one or more processing circuits are further configured to determine that the electronic device is to perform a relay selection process when a difference between a change rate of the received power of the neighbor cell indicated by the received neighbor cell power change rate information and a change rate of the received power of the serving cell indicated by the received serving cell power change rate information is less than a third threshold.

9. The electronic device according to claim 8, wherein the one or more processing circuits are further configured to:
   acquire target relay information on a target relay user equipment obtained after the user equipment performs the relay reselection process; and
   perform the relay selection process,
   wherein when performing the relay selection process, the one or more processing circuits are further configured to:
   monitor a discovery message of the target relay user equipment indicated by the target relay information with a priority;
   determine that the quality of the link between the target relay user equipment and the electronic device is greater than a predetermined threshold; and
   establish a relay connection between the target relay user equipment and the electronic device.

10. The electronic device according to claim 9, wherein, before determining that the quality of the link between the target relay user equipment and the electronic device is greater than the predetermined threshold, the one or more processing circuits are further configured to:
    determine that load factors of the target relay user equipment which is indicated by the target relay information are less than a predetermined number, the load factors representing the number of remote user equipment accessing to the target relay user equipment.

11. A method for performing wireless communication in a wireless communication system, comprising:
    measuring a first link quality between the electronic device and a relay user equipment in the wireless communication system a service for the electronic device in the wireless communication system, and receive discovery signals;
    performing a relay reselection process based on the received discovery signal and the measured result;
       performing a communication with a base station through the relay user equipment when a second link quality between the electronic device and the base station becomes poor;
       in a case when both the first link quality is greater than a first threshold and the second link quality is less than a second threshold, determine that the electronic device is to perform a handover process.

\* \* \* \* \*